(12) United States Patent
Lee et al.

(10) Patent No.: US 9,296,223 B2
(45) Date of Patent: Mar. 29, 2016

(54) ELECTRONIC PAPER AND PRINTING DEVICE

(71) Applicant: Samsung Electronics Co., Ltd., Gyeonggi-do (KR)

(72) Inventors: Jong-In Lee, Gyeonggi-do (KR); Sung-Jin Park, Seoul (KR); Seong-Woon Kang, Gyeonggi-do (KR); Young-Woong Kim, Seoul (KR); Kyu-Suk Lee, Gyeonggi-do (KR); Kyung-Hoon Cha, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 72 days.

(21) Appl. No.: 13/852,532

(22) Filed: Mar. 28, 2013

(65) Prior Publication Data
US 2013/0257802 A1    Oct. 3, 2013

(30) Foreign Application Priority Data

Mar. 30, 2012 (KR) .......................... 10-2012-0033348
Mar. 13, 2013 (KR) .......................... 10-2013-0026776

(51) Int. Cl.
| G09G 5/00 | (2006.01) |
| B41J 3/407 | (2006.01) |
| G06F 3/0488 | (2013.01) |
| G02F 1/167 | (2006.01) |

(52) U.S. Cl.
CPC ............... *B41J 3/4076* (2013.01); *G02F 1/167* (2013.01); *G06F 3/0488* (2013.01)

(58) Field of Classification Search
CPC ... G06F 3/0488; G06F 3/04883; G06F 3/044; G09F 9/372; G02F 1/167; G09G 3/344
USPC .......................................... 345/156, 173–179
See application file for complete search history.

(56) References Cited

U.S. PATENT DOCUMENTS

| 7,053,799 | B2 | 5/2006 | Yu et al. | |
| 8,569,758 | B2 * | 10/2013 | Sun et al. | 257/59 |
| 2007/0221951 | A1 | 9/2007 | Hsu et al. | |
| 2007/0224742 | A1 | 9/2007 | Hsu et al. | |
| 2007/0283248 | A1 * | 12/2007 | Yoshida | 715/526 |
| 2009/0219247 | A1 * | 9/2009 | Watanabe et al. | 345/157 |
| 2010/0164888 | A1 * | 7/2010 | Okumura et al. | 345/173 |
| 2011/0193837 | A1 * | 8/2011 | Sato | 345/205 |
| 2011/0234513 | A1 * | 9/2011 | Pan et al. | 345/173 |
| 2012/0092259 | A1 * | 4/2012 | Liu et al. | 345/168 |
| 2013/0127748 | A1 * | 5/2013 | Vertegaal et al. | 345/173 |

FOREIGN PATENT DOCUMENTS

| JP | 2006295837 | 10/2006 |
| JP | 2011237644 | 11/2011 |
| KR | 1020110063225 | 6/2011 |

* cited by examiner

*Primary Examiner* — Jennifer Nguyen
(74) *Attorney, Agent, or Firm* — The Farrell Law Firm, P.C.

(57) ABSTRACT

A printing device for transferring an image representing contents on electronic paper is provided. The printing device includes an electronic paper controller for generating a control signal for transferring the image and outputting the generated control signal to the electronic paper, a touch sensor on a top surface of which the electronic paper is disposed to detect a user input command, a touch sensor controller for outputting a control signal to the touch sensor for driving the touch sensor and receiving the user input command detected by the touch sensor, and a main controller for controlling the electronic paper controller to change an image displayed on the electronic paper according to the user input command input from the touch sensor controller.

19 Claims, 20 Drawing Sheets

ELECTRONIC PAPER AND PRINTING DEVICE

PRIORITY

This application claims priority under 35 U.S.C. §119(a) to a Korean Patent Application filed in the Korean Intellectual Property Office on Mar. 30, 2012 and assigned Serial No. 10-2012-0033348, and a Korean Patent Application filed in the Korean Intellectual Property Office on Mar. 13, 2013 and assigned Serial No. 10-2013-0026776, the entire disclosures of which are hereby incorporated by reference.

BACKGROUND OF THE INVENTION

1. Field of the Invention

The present invention generally relates to electronic paper, and more particularly, to electronic paper and a printing device for transferring an image to the electronic paper.

2. Description of the Related Art

Conventionally, a keypad assembly using electronic paper has been disclosed. In U.S. Pat. No. 7,053,799, electronic paper is interposed between a transparent keypad having actuator buttons and a plurality of switches, and the electronic paper is illuminated through the transparent keypad using a light emitting device disposed between a housing and the transparent keypad, thereby expressing symbol patterns on the electronic paper.

Although various devices using the electronic device have been disclosed, they are not flexible and do not have a thin form. They are also expensive.

Hence, there is a need for electronic paper which allows the electronic paper to be used like general flexible, thin, and cheap paper, and a printing device for the electronic paper.

SUMMARY OF THE INVENTION

The present invention has been made to address at least the problems and disadvantages described above and to provide at least the advantages described below.

Accordingly, aspects of the present invention provide electronic paper which allows the electronic paper to be used like general flexible, thin, and cheap paper, and a printing device for the electronic paper.

According to an aspect of the present invention, there is provided a printing device for transferring an image representing content on electronic paper, the printing device including an electronic paper controller for generating a control signal for transferring the image and outputting the generated control signal to the electronic paper, a touch sensor on a top surface of which the electronic paper is disposed to detect a user input command, a touch sensor controller for outputting to the touch sensor a control signal for driving the touch sensor and receiving the user input command detected by the touch sensor, and a main controller for controlling the electronic paper controller to change an image displayed on the electronic paper according to the user input command input from the touch sensor controller.

According to another aspect of the present invention, there is provided electronic paper including bottom and top substrates formed of a plastic material, an ink layer which is interposed between the bottom substrate and the top substrate and expresses an image pattern through movement of particles according to an applied electric field, and a backplane which is interposed between the bottom substrate and the top substrate, generates the electric field, and has a conductor formed of an organic material and an insulating layer.

According to another aspect of the present invention, there is provided electronic paper including an imaging sheet for displaying contents, a sensing unit which is disposed in an edge portion of the imaging sheet or in a circumferential portion of the imaging sheet to sense a user input, and a driving unit for driving the imaging sheet and the sensing unit.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF THE EMBODIMENTS OF THE PRESENT INVENTION

Figure 1:
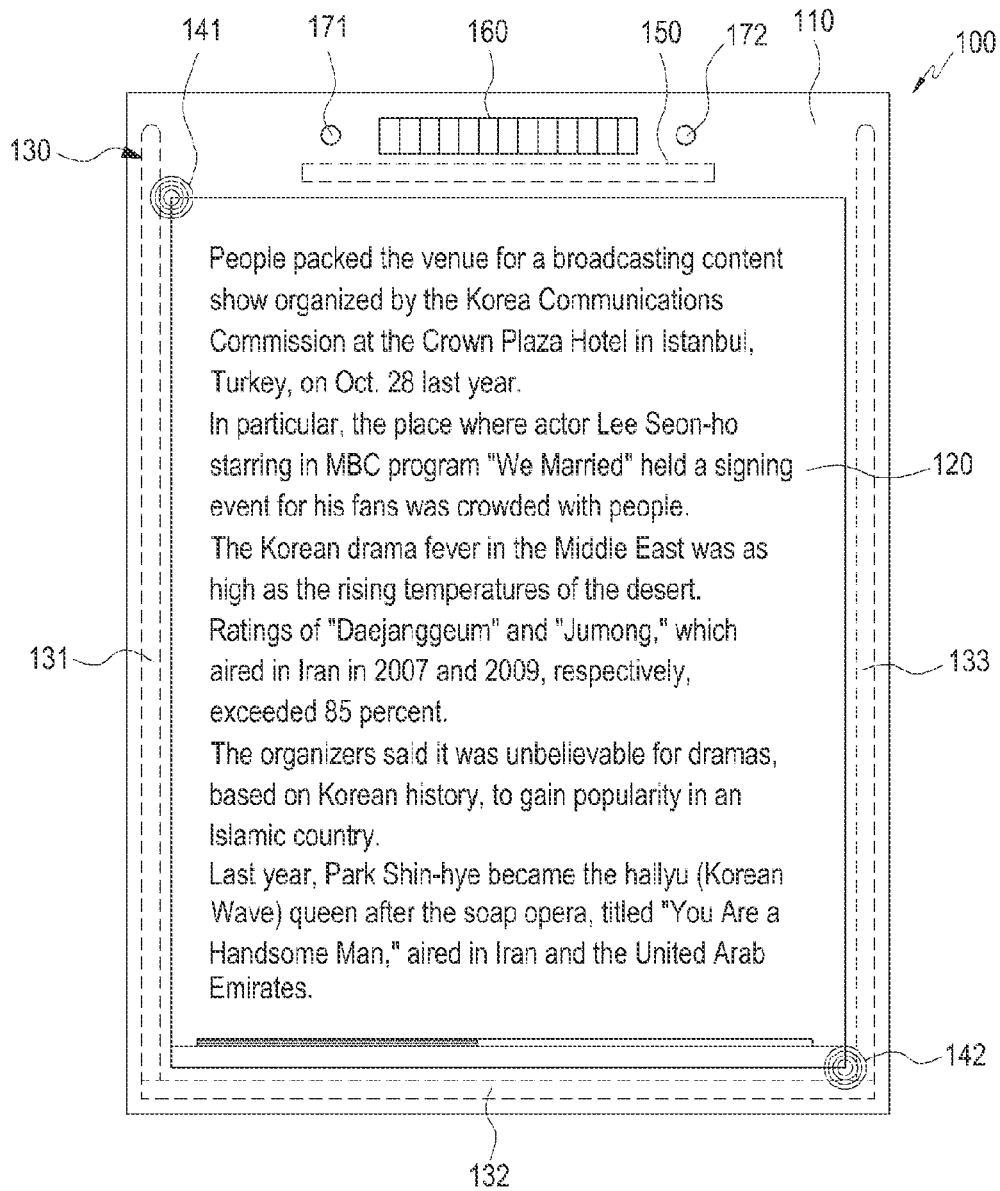
FIG. 1 is a floor plan illustrating an Electrophoretic Display (EPD) panel according to a first embodiment of the present invention.

As the present invention allows for various changes and numerous embodiments, particular embodiments will be illustrated in the drawings and described in detail. However, the present invention is not limited to the specific embodiments and should be construed as including all changes, equivalents, and substitutions included in the spirit and scope of the present invention.

Although ordinal numbers such as "first", "second", and so forth will be used to describe various components, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

When it is mentioned that a component is "connected" or "accessed" to another component, it may be understood that the component is directly connected or accessed to the another component or that still other component is interposed between the two components. On the other hand, when it is mentioned that a component is "directly connected" or "directly accessed" to another component, it may be understood that no component is interposed therebetween.

The terminology used herein is for the purpose of describing embodiments only and is not intended to be limiting. As used herein, the singular forms are intended to include plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings.

An Electrophoretic Display (EPD) panel according to the present invention displays content on an imaging sheet according to a control signal input from a printing device, and outputs information resulting from sensing of a user input to the printing device. The printing device transfers an image representing the content to the EPD panel. The content includes a menu screen, a still image (a picture), a document (a digital book, a digital newspaper, and a web page), and so forth.

Although an EPD panel is described as an example of electronic paper herein, the present invention may be applied to electronic paper having an arbitrary structure or form which displays contents through external ambient light without an internal illumination means. Therefore, the EPD panel may be expressed as electronic paper, and an EPD controller may be expressed as an electronic paper controller.

Figure 2:
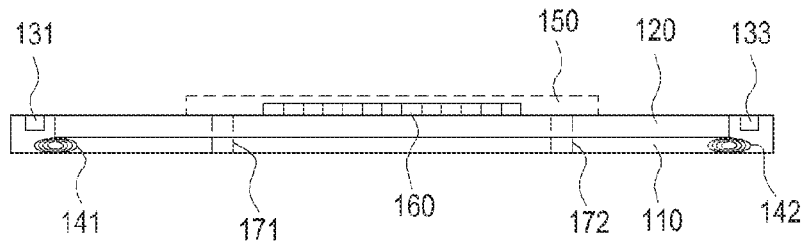
FIG. 2 is a cross-sectional view illustrating the EPD panel.

FIG. 1 is a floor plan illustrating an EPD panel 100 according to a first embodiment of the present invention, and FIG. 2 is a cross-sectional view illustrating the EPD panel 100.

The EPD panel 100 includes a cover sheet 110 for protecting other components in the EPD panel 100, an imaging sheet 120 for displaying content, a driving unit 150 for driving the imaging sheet 120 and a sensing unit 130 according to a control signal input from a printing device, the sensing unit 130 for sensing a user input, an interface 160 for communication with the printing device, and coordinate correction identification tags 141 and 142. The driving unit 150 includes a first driving unit for driving the imaging sheet 120 and a second driving unit for driving the sensing unit 130.

The cover sheet 110 forms an outer surface of the EPD panel 100 together with a top surface of the imaging sheet 120 to protect other components in the EPD panel 100. The cover sheet 100 may be formed of a synthetic resin or plastic material such as polyimid, Polyethylene Terephthalate (PET), or the like. The cover sheet 110 may have the form of a rectangular plate in a center portion of which a groove for receiving the imaging sheet 120 is formed. Unlike in the current example, the cover sheet 110 may have a form which completely encloses other components in the EPD panel 100 including the imaging sheet 120.

The cover sheet 110 is selectively applied to the EPD panel 100, and instead of the cover sheet 110, bottom and top substrates of the imaging sheet 120 may be bonded or adhered to each other to completely enclose other components in the EPD panel 100. In the following description, selective application of an element means that the element may be removed.

The imaging sheet 120 is structured such that pixels having the same configuration are arranged in an N×M matrix. The image displayed on a screen of the imaging sheet 120 (that is, the top surface of the imaging sheet 120) includes a group of points expressed by the pixels.

Figure 3:
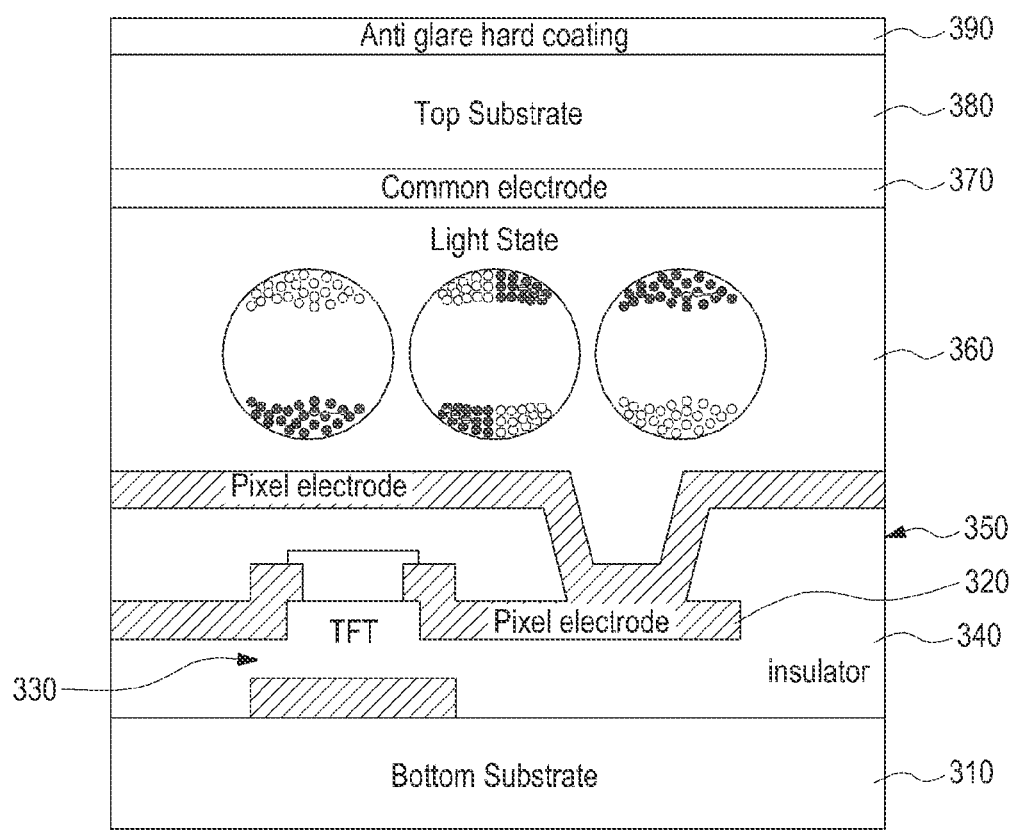
FIG. 3 is a cross-sectional view illustrating a pixel of an imaging sheet.

FIG. 3 is a cross-sectional view illustrating a pixel of the imaging sheet 120. A material and a thickness of each component of the imaging sheet 120 are set to have flexible and thin characteristics.

The imaging sheet 120 is illuminated by ambient light from an external environment, and displays content through reflection or absorption of light.

The imaging sheet 120 includes a bottom substrate 310, an organic electronic backplane 350, an ink layer 360, a common electrode layer 370, a top substrate 380, and a hard coating layer 390 to prevent glare, which are sequentially stacked in this order.

The bottom and top substrates 310 and 380 protect the ink layer 360 and the electrode layers of the backplane 350 and the common electrode 370, and may be formed of a synthetic resin or plastic material such as polyimid or PET, which may guarantee heat resistance, high transmission features, and good writing sensation. The bottom substrate 310 may have a thickness of 20 µm-30 µm, and preferably, a thickness of 22.5 µm-27.5 µm.

The hard coating layer 390 is stacked on a top surface of the top substrate 380, and may have an anti-glare function. For example, the hard coating layer 390 may be formed of a material in which a light-scattering agent is added to a typical hard coating agent. The hard coating layer 390 may be selectively applied to the top substrate 380, and the hard coating layer 390 and the top substrate 380 may have a thickness of 24 µm-36 µm, and preferably, a thickness of 27 µm-33 µm.

The ink layer 360 expresses a color or a black/white image pattern through movement of particles based on an applied electric field (that is, an electrophoresis phenomenon), and displays an image through reflection or absorption of external light incident to the pattern. For example, the ink layer 360 is configured in which microcapsules filled with transparent fluid containing white and black particles are disposed between the organic electronic backplane 350 and the common electrode layer 370, such that by applying the electric field to the respective microcapsules, a black or white image pattern is expressed. For example, a white particle is charged with (+) and a black particle is charged with (−), such that they move in opposite directions by the applied electric field. The image pattern of the ink layer 360 is maintained until an electric field change point. The ink layer 360 may express a color image pattern, and such color expression may be implemented by stacking a color filter on the ink layer 360 or using coloring particles instead of black/white particles as particles of the ink layer 360.

The common electrode layer 370 is interposed between the ink layer 360 and the top substrate 380, maintains a constant electric potential, and may be connected with ground. The common electrode layer 370 and the ink layer 360 may have a thickness of 32 µm-48 µm, and preferably, a thickness of 36 µm-44 µm.

The organic electronic backplane 350 includes a plurality of pixels, each of which includes a pixel electrode 320 and a Thin Film Transistor (TFT) 330 which are partially or entirely filled in the insulating layer 340 or are partially or entirely stacked on a top surface of the insulating layer 340. The common electrode layer 370 and conductive portions of the organic electronic backplane 350, such as the pixel electrode 320 and the TFT 330, are formed of carbon-containing organic materials, an example of which may be graphene. The organic electronic backplane 350 may have a thickness of 4 µm-6 µm, and preferably, a thickness of 4.5 µm-5.5 µm.

The imaging sheet 120 as a whole may have a thickness of 0.08 mm-0.2 mm, and preferably, a thickness of 0.09 mm-0.11 mm, and may form single electronic paper.

Figure 4:
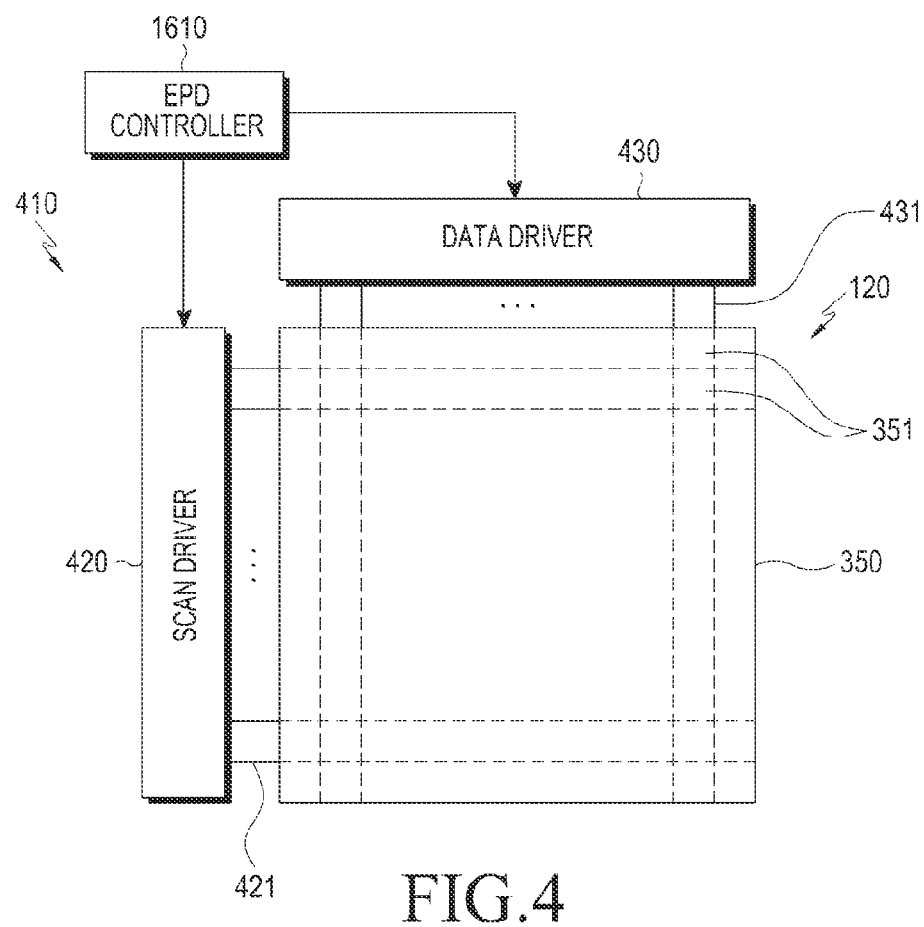
FIG. 4 is a diagram describing a method for driving the imaging sheet.
Figure 5:
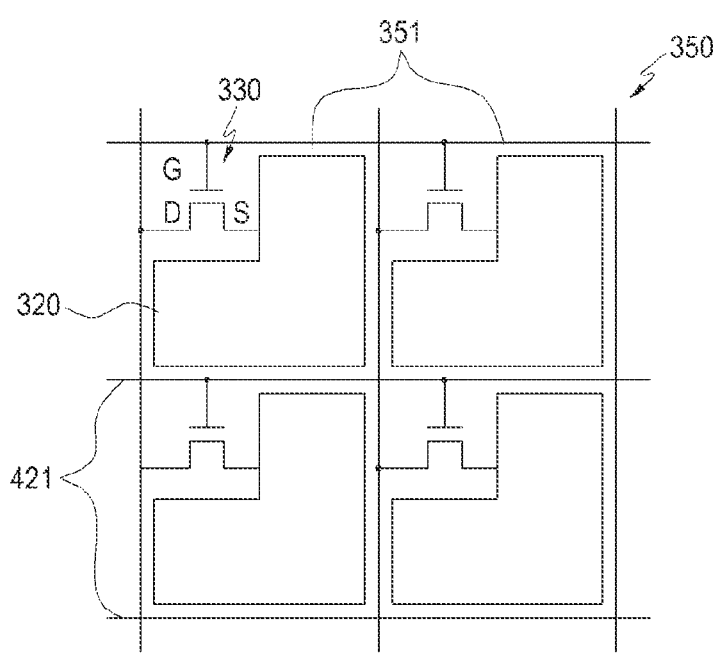
FIG. 5 is a circuit diagram illustrating an organic electronic backplane according to an embodiment of the present invention.

FIG. 4 is a diagram describing a method for driving the imaging sheet 120, and FIG. 5 is a circuit diagram of the organic electronic backplane 350.

A first driving unit 410 of the driving unit 150 generates address signals (that is, row signals) and data signals (that is, column signals) according to a control signal for image display, which is input from an EPD controller 1610, and outputs the address signals and the data signals to the organic electronic backplane 350. The first driving unit 410 includes a scan driver 420 and a data driver 430. The scan driver 420 sequentially supplies address signals to scan lines 421 under control of the EPD controller 1610, and the data driver 430 supplies data signals to the data lines 431 under control of the EPD controller 1610.

In FIG. 5, the organic electronic backplane 350 includes a plurality of pixels 351, each of which includes a pixel electrode 320 and a TFT 330. Each pixel electrode 320 is connected to a scan line 421 and a data line 431 through the TFT 330. Each TFT 330 includes a gate (G), a drain (D), and a source (S), in which the gate is connected with the scan line 421, the drain is connected with the data line 431, and the source is connected with the pixel electrode 320. Each TFT 330 functions as an on/off switch, such that the TFT 330 is in an on state when signals are supplied to both the scan line 421 and the data line 431 and a voltage is applied to the pixel electrode 320 when the TFT 330 is in the on state.

The ink layer 360 expresses an image pattern through movement of particles based on an electric field applied between the common electrode 370 and the organic electronic backplane 350. The ink layer 360 has an image pattern corresponding to the foregoing image transferring operation, and the image pattern is maintained until the next image transferring operation.

The sensing unit 130 is positioned in the left end portion, right end portion, and bottom end portion of the cover sheet 110 to be in the circumference of the imaging sheet 120.

The sensing unit 130 is a pressure sensor which senses a pressure applied by a user input means (a finger, a pen, or the like), and as is shown in FIG. 1, has first through third strips 131, 132, and 133 which extend in the form of U from the left top end portion of the EPD panel 100 through the bottom end portion of the EPD panel 100 to the right top end portion of the EPD panel 100. The sensing unit 130 may have an arbitrary form for sensing a user input and may include a single strip.

Figure 6:
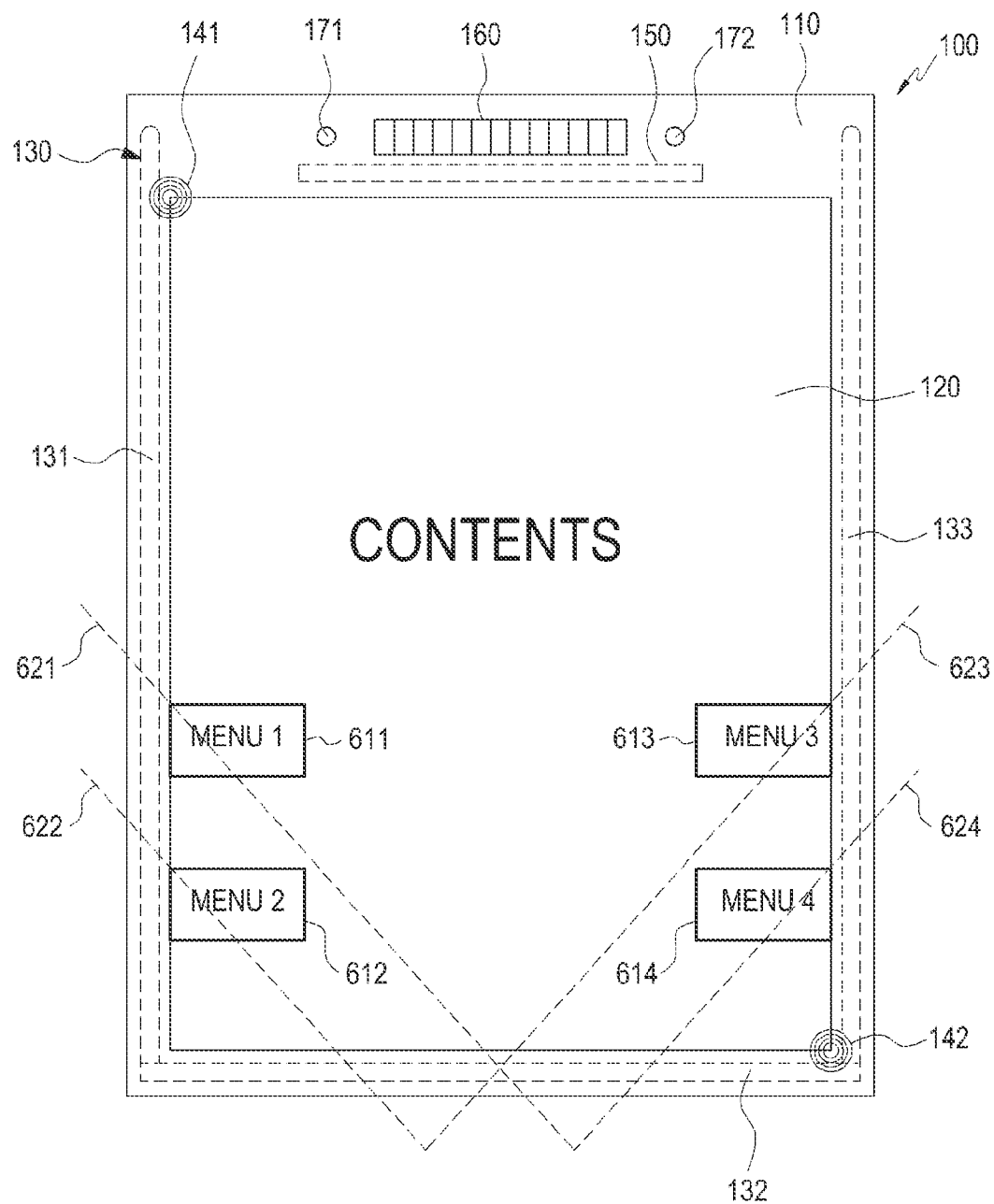
FIG. 6 is a diagram describing a method for using a sensing unit according to an embodiment of the present invention.

FIG. 6 is a diagram describing a method for using the sensing unit 130. As shown in FIG. 6, selectable menus 611, 612, 613, and 614 are displayed on the imaging sheet 120, and when the user bends the EPD panel 100 along one of virtual index lines 621, 622, 623, and 624, a menu corresponding to the index line is selected. For example, if the user bends the EPD panel 100 along the first index line 621, the first menu 611 is selected. The menu may be selectively displayed on the imaging sheet 120, or if the user bends the EPD panel 100 along the third index line 623 or the fourth index line 624, then, for example, a next page of a digital book may be displayed without menu display. If the user bends the EPD panel 100 along the first index line 621 or the second index line 622, then for example, a previous page of the digital book may be displayed.

The sensing unit 130 outputs user input information corresponding to user's bending of the EPD panel 100 to the EPD controller 1610.

The sensing unit 130 may be configured to sense a user input direction and execute a menu corresponding to the user input direction.

Figure 7:
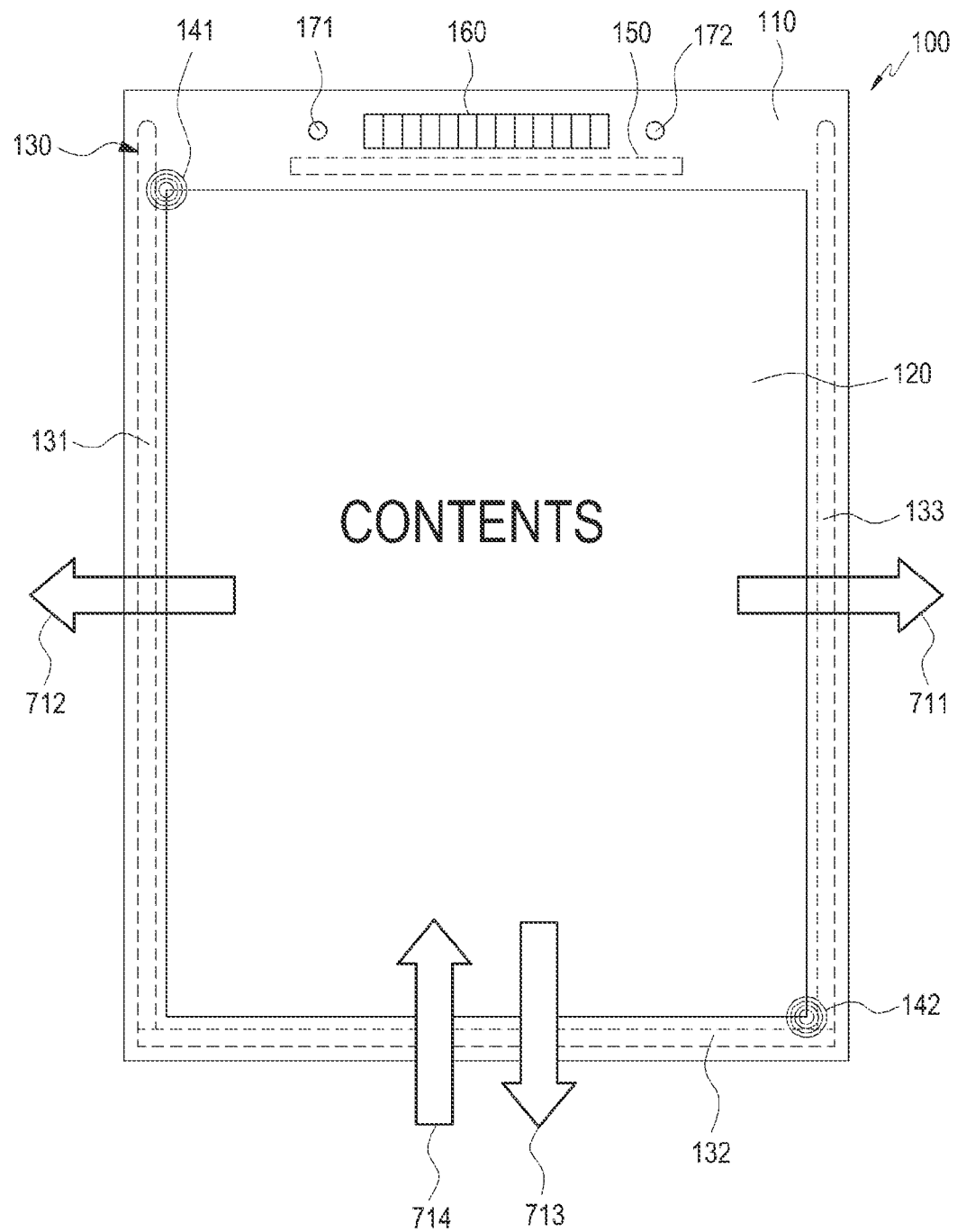
FIG. 7 is a diagram describing another method for using a sensing unit according to an embodiment of the present invention.

FIG. 7 is a diagram describing another method for using the sensing unit 130. The sensing unit 130 is configured to sense a user input direction and execute a menu corresponding to the user input direction. For example, if the user presses the third strip 133 from the left to the right along a rightward arrow 711, a first command such as 'move to next page' is input. If the user presses the first strip 131 from the right to the left along a leftward arrow 712, a second command such as 'move to previous page' is input. If the user presses the second strip 132 from the top downwardly along a downward arrow 713, a third command such as 'view menu' is input. If the user presses the second strip 132 from the bottom upwardly along an upward arrow 714, a fourth command such as 'move store' is input.

User input information using the sensing unit 130 may be various, and the user input information may include zoom-in/zoom-out, setting of font type and size, page scrapping, checking and management of a scrapped document, and search/selection of a digital or electronic document downloaded from a store and stored in a printing device.

Figure 8:
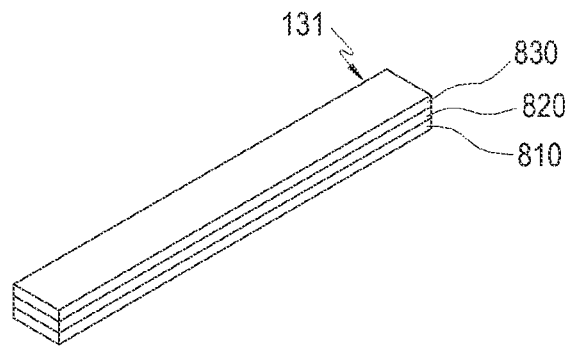
FIG. 8 is a perspective view illustrating a first strip of a sensing unit according to an embodiment of the present invention.
Figure 9:
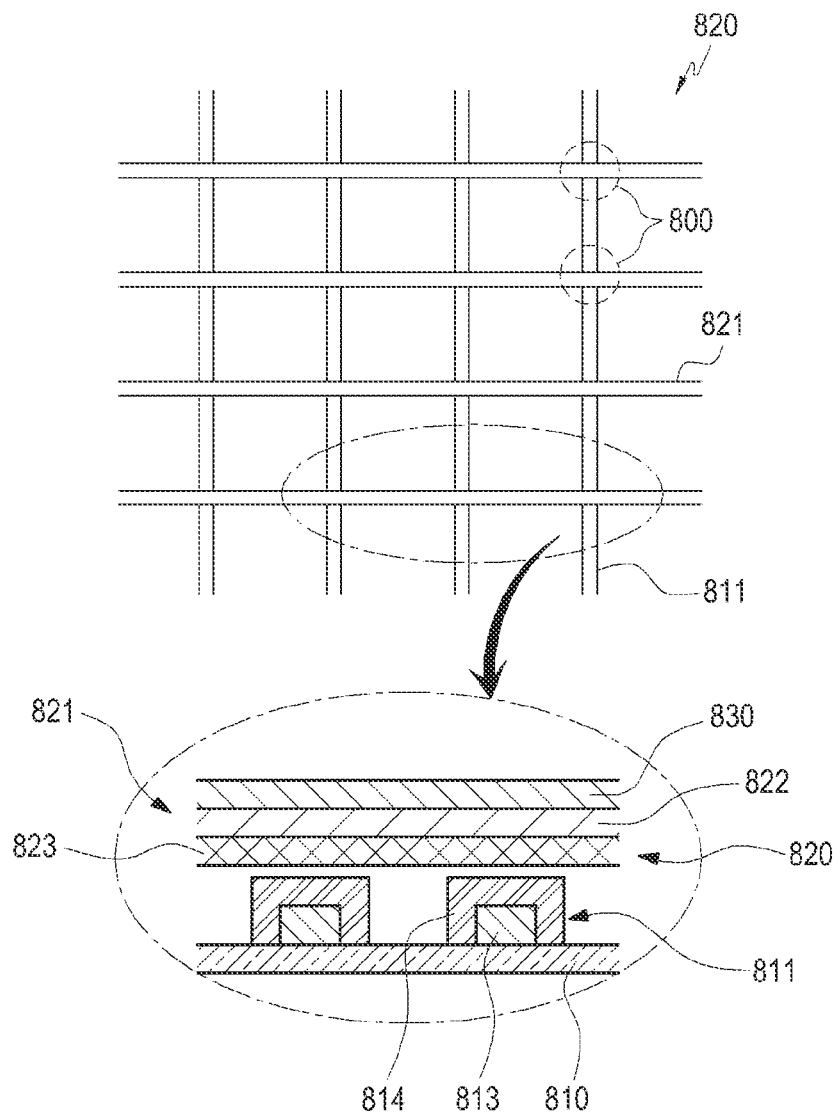
FIG. 9 is a diagram describing a principle on which the sensing unit senses a user input according to an embodiment of the present invention.

FIG. 8 is a perspective view illustrating the first strip 131 of the sensing unit 130, and FIG. 9 is a diagram describing a principle by which the sensing unit 130 senses user input. The following description is made based on the first strip 131, but is also equally applied to the second strip 132 and the third strip 133.

The first strip 131 includes a sensor layer 820 for recognizing input position and/or input pressure of a user input means and a first substrate 810 and a second substrate 830 which are stacked on a bottom surface and a top surface of the sensor layer 820, respectively, to support the sensor layer 820.

The sensor layer 820 has a pattern for recognizing the input position and/or input pressure of the user input means, which can be for example, a linear lattice pattern or a diamond-shape pattern. In the following description, the sensor layer 820 is assumed to have a linear lattice pattern.

First sensor lines 811 are stacked on a top surface of the first substrate 810 and second sensor lines 821 are stacked on a bottom surface of the second substrate 830, in which the top surface of the first substrate 810 and the bottom surface of the second substrate 830 face each other.

The first sensor lines 811 extend along a first direction (for example, along a Y axis or a vertical direction), and are disposed at equal intervals or different intervals along a second direction (for example, an X axis or a horizontal direction) which perpendicularly intersects the first direction. The second sensor lines 821 extend along the second direction which perpendicularly intersects the first direction, and are disposed at equal intervals or different intervals along the first direction.

Referring to FIG. 9, the sensor layer 820 senses user input on the following principle. The first sensor lines 811 stacked on the top surface of the first substrate 810 include a first electrode line 813 directly stacked on the top surface of the first substrate 810 and a first resistance layer 814 stacked to enclose an exposed outer circumferential surface of the first electrode line 813. The second sensor lines 821 stacked on the bottom surface of the second substrate 830 include a second electrode line 822 stacked on the bottom surface of the second substrate 830 and a second resistance layer 823 stacked to enclose an exposed outer circumferential surface of the second electrode line 822. The first substrate 810 and the second substrate 830 may be formed of a synthetic resin or plastic material such as polyimide or PET, and the first electrode line 813 and the second electrode line 822 may be formed of a carbon-containing organic material such as graphene. The first resistance layer 814 and the second resistance layer 823 may be formed of a resistive material such as carbon, and the first resistance layer 814 and the second resistance layer 823 may be spaced apart from each other or may contact each other, and may have rough surfaces, respectively.

To perform a sensing function, voltages (that is, scan signals) having a preset waveform are sequentially applied to the second electrode lines 822, and the first electrode lines 813 output sensing signals originating from the scan signals. If the user input means presses the first strip 131, a contact area between the first resistance layer 814 and the second resistance layer 823 changes, such that a total resistance of the first resistance layer 814 and the second resistance layer 823 changes. Due to the resistance change, voltage waveforms of the sensing signals output from the first electrode lines 813 change, and input position and input pressure of the user input means are recognized from the sensing signals whose voltage waveforms have changed. Points at which the first sensor lines 811 and the second sensor lines 821 intersect are sensing points 800, and in this example, the sensing points 800 are arranged in a matrix structure. That is, a user input position is determined to be one of positions of the sensing points 800.

Figure 10:
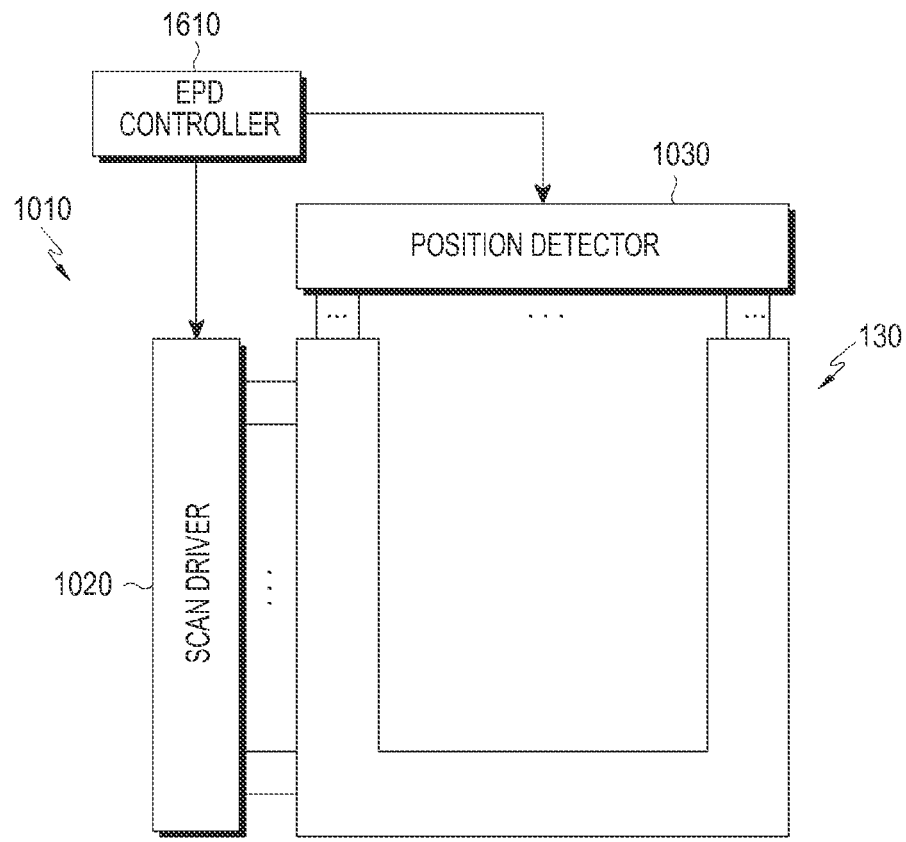
FIG. 10 is a diagram describing a method for driving the sensing unit.

FIG. 10 is a diagram describing a method for driving the sensing unit 130.

A second driving unit 1010 drives the sensing unit 130 under control of the EPD controller 1610, and outputs user input information including input position and/or input pressure recognized from a sensing signal output from the sensing unit 130 to the EPD controller 1610. A scan driver 1020 sequentially supplies scan signals to the second electrode lines 822 under control of the EPD controller 1610, and a position detector 1030 recognizes the input position and/or input pressure of the user input means from the sensing signals having changed voltage waveforms, output from the first electrode lines 813, and outputs the recognized user input information to the EPD controller 1610.

Referring back to FIG. 1, the interface 160 is a connector and delivers a control signal input from the EPD controller 1610 to the driving unit 150 and outputs user input information input from the driving unit 150 to the EPD controller 1610.

The coordinate correction identification tags 141 and 142 are disposed in left upper end portion and right lower end portion of the EPD panel 100, respectively. Each of the coordinate correction identification tags 141 and 142 delivers alignment information to a printing device when the EPD panel 100 is mounted on the printing device. The coordinate correction identification tags 141 and 142 receive an electromagnetic field induced from an external environment and emit the electromagnetic field, such that the positions of the coordinate correction identification tags 141 and 142 may be identified by the printing device.

The EPD panel 100 includes a pair of fixing members, that is, holes 171 and 172 to help alignment of the EPD panel 100 when the EPD panel 100 is mounted on the printing device.

Figure 11:
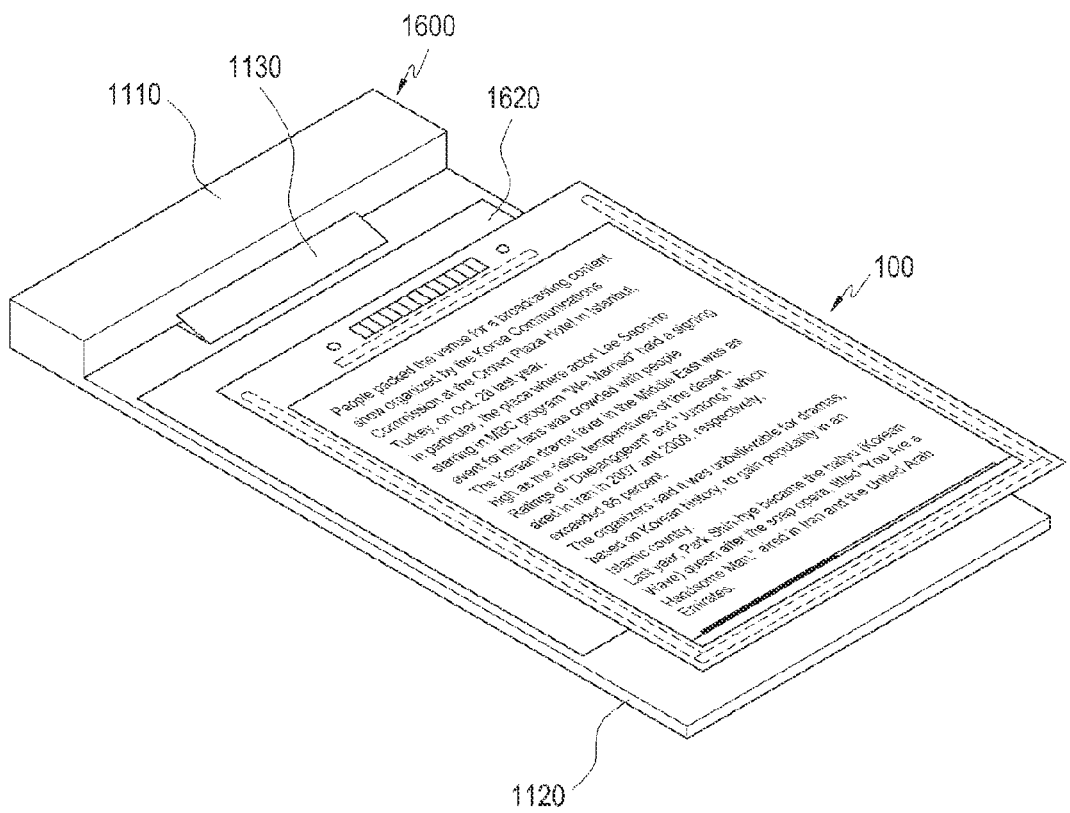
FIG. 11 is a diagram illustrating a state in which a printing device according to the first embodiment of the present invention and an EPD panel are separated.
Figure 12:
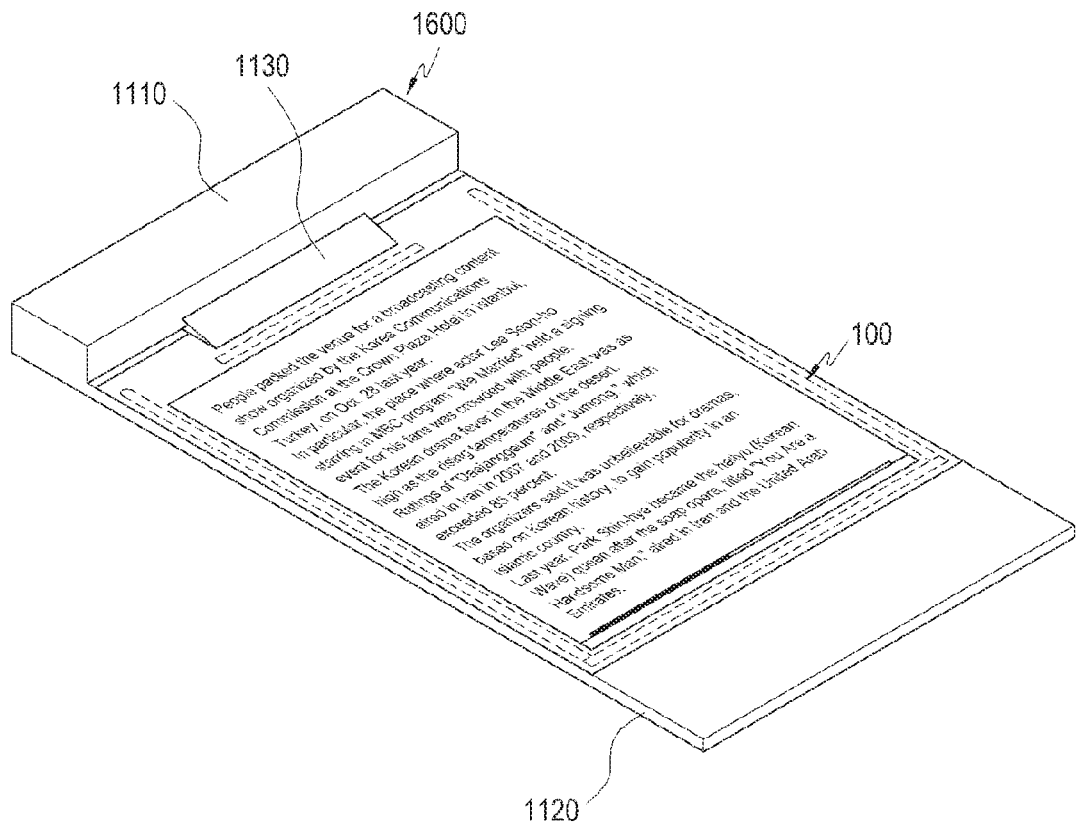
FIG. 12 is a diagram illustrating a state in which the printing device according to the first embodiment of the present invention and the EPD panel are coupled.

FIG. 11 is a diagram illustrating a state in which a printing device 1600 and the EPD panel 100 according to the first embodiment are separated, and FIG. 12 is a diagram illustrating a state in which the printing device 1600 and the EPD panel 100 are coupled.

A printing device 1600 includes a substrate 1120, a main board 1110 mounted on the substrate 1120, a clip 1130 for fixing the EPD panel 100, and a touch sensor 1620 for detecting user input.

Figure 13:
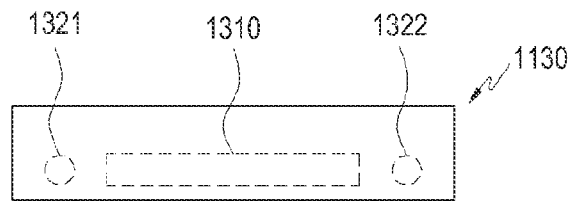
FIG. 13 is a floor plan illustrating a clip according to an embodiment of the present invention.
Figure 14:
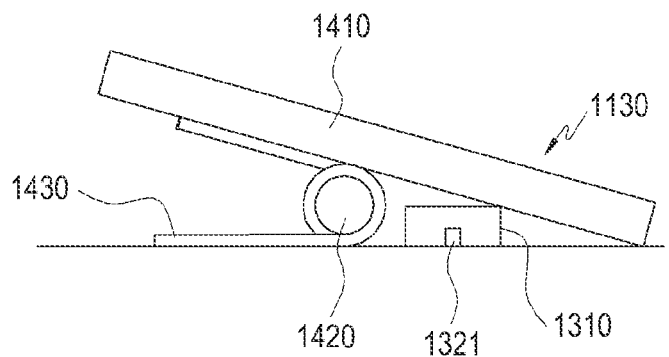
FIG. 14 is a side view illustrating a clip according to an embodiment of the present invention.

FIG. 13 is a floor plan illustrating clip 1130, and FIG. 14 is a side view illustrating the clip 1130.

On a top surface of the substrate 1120 covered by the clip 1130 are formed an interface 1310 for communication with the EPD panel 100 and a pair of fixing members, that is, protrusions 1321 and 1322 which are disposed at both sides of the interface 1310 to be coupled with the holes 171 and 172 of the EPD panel 100. The protrusions 1321 and 1322 are inserted into the holes 171 and 172 of the EPD panel 100. The interface 1310 is a connector and is coupled with the interface 160 of the EPD panel 100.

The clip 1130 includes a press plate 1410 which a user presses by hand, an elastic member 1430 such as a spring, and a support member 1420 by which the elastic member 1430 is stopped. If the user presses an end portion of the press plate 1410, the other end portion of the press plate 1410 is lifted and the EPD panel 100 is inserted into a space between the other end portion and the substrate 1120. Thereafter, if a force applied by the user is released, then the other end portion of the press plate 1410 moves down to the original position by a restoring force of the elastic member 1430, thus pressing and fixing the EPD panel 100.

Figure 15:
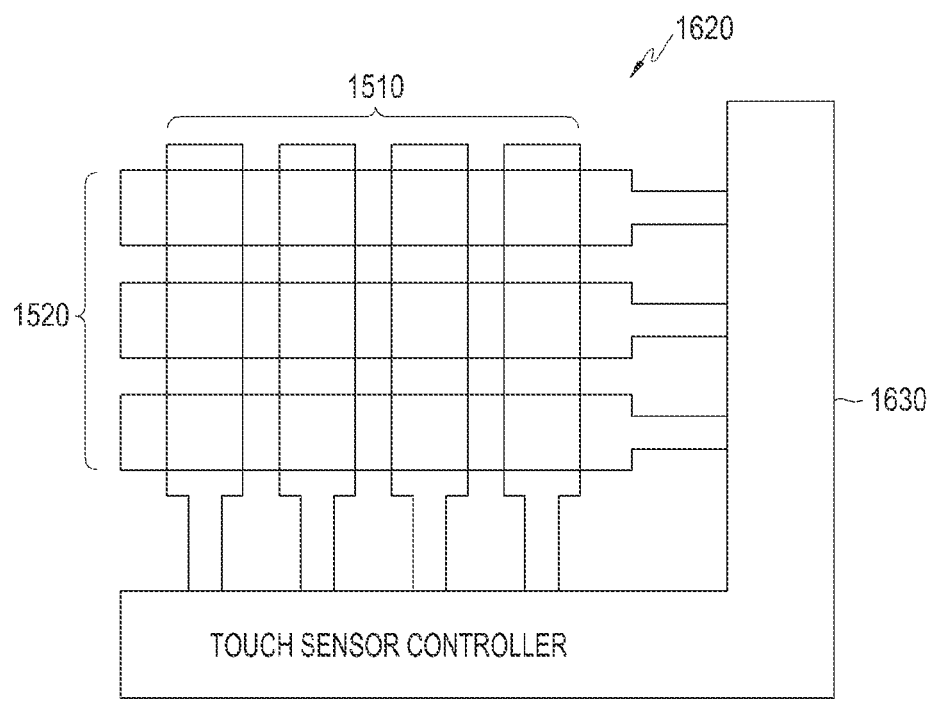
FIG. 15 is a diagram describing a method for driving a touch sensor according to an embodiment of the present invention.

FIG. 15 is a diagram describing a method for driving the touch sensor 1620.

The touch sensor 1620 is a touch sensor of an Electromagnetic Radiation (EMR) type, which includes a first sub loop unit 1510 and a second sub loop unit 1520, operates under control of a touch sensor controller 1630, and outputs a sensing signal to the touch sensor controller 1630.

The first sub loop unit 1510 and the second sub loop unit 1520 may be disposed in directions orthogonal to each other.

The first sub loop unit 1510 extends longer in the y-axis direction than in the x-axis direction, thus being used to sense an x-axis coordinate. The second sub loop unit 1520 extends longer in the x-axis direction than in the y-axis direction, thus being used to sense a y-axis coordinate. A plurality of loops forming the first sub loop unit 1510 and the second sub loop unit 1520 sense electromagnetic change or conduct electric current.

The first sub loop unit 1510 receives electric current from the touch sensor controller 1630 to allow the electric current to flow in the respective loops. The first sub loop unit 1510 induces a predetermined electromagnetic field based on the conducted current to emit the electromagnetic field to the outside environment.

A pen situated around a loop unit receives the induced electromagnetic field from the first sub loop unit 1510 and emits the induced electromagnetic field. The pen is merely an embodiment and may be any means capable of receiving and then emitting an electromagnetic field. Such means may be collectively referred to as a user input means. The pen includes a resonance circuit having a coil and a condenser, a position of which may be sensed by the EMR type touch sensor 1620.

The loops of the second sub loop unit 1520 may be controlled to perform a preset electromagnetic change. The loops of the second sub loop unit 1520 sense an electromagnetic change emitted from the pen. Since the pen may emit an electromagnetic field delivered from the first sub loop unit 1510, the electromagnetic field from the pen may change and the second sub loop unit 1520 senses the electromagnetic change. The second sub loop unit 1520 may sense the electromagnetic change and may determine a y coordinate of the pen based on the magnitude of a maximum sensing signal sensed from a maximum signal loop which senses the maximum sensing signal and the magnitudes of sensing signals sensed from loops which are adjacent to the maximum signal loop.

Likewise, the first sub loop unit 1510 may induce the predetermined electromagnetic field based on the conducted electric current and emit the electromagnetic field to outside. The second sub loop unit 1520 may sense electromagnetic change and determine an x coordinate of the pen based on the magnitude of a maximum sensing signal sensed from a maximum signal loop which senses the maximum sensing signal and the magnitudes of sensing signals sensed from loops which are adjacent to the maximum signal loop.

Figure 16:
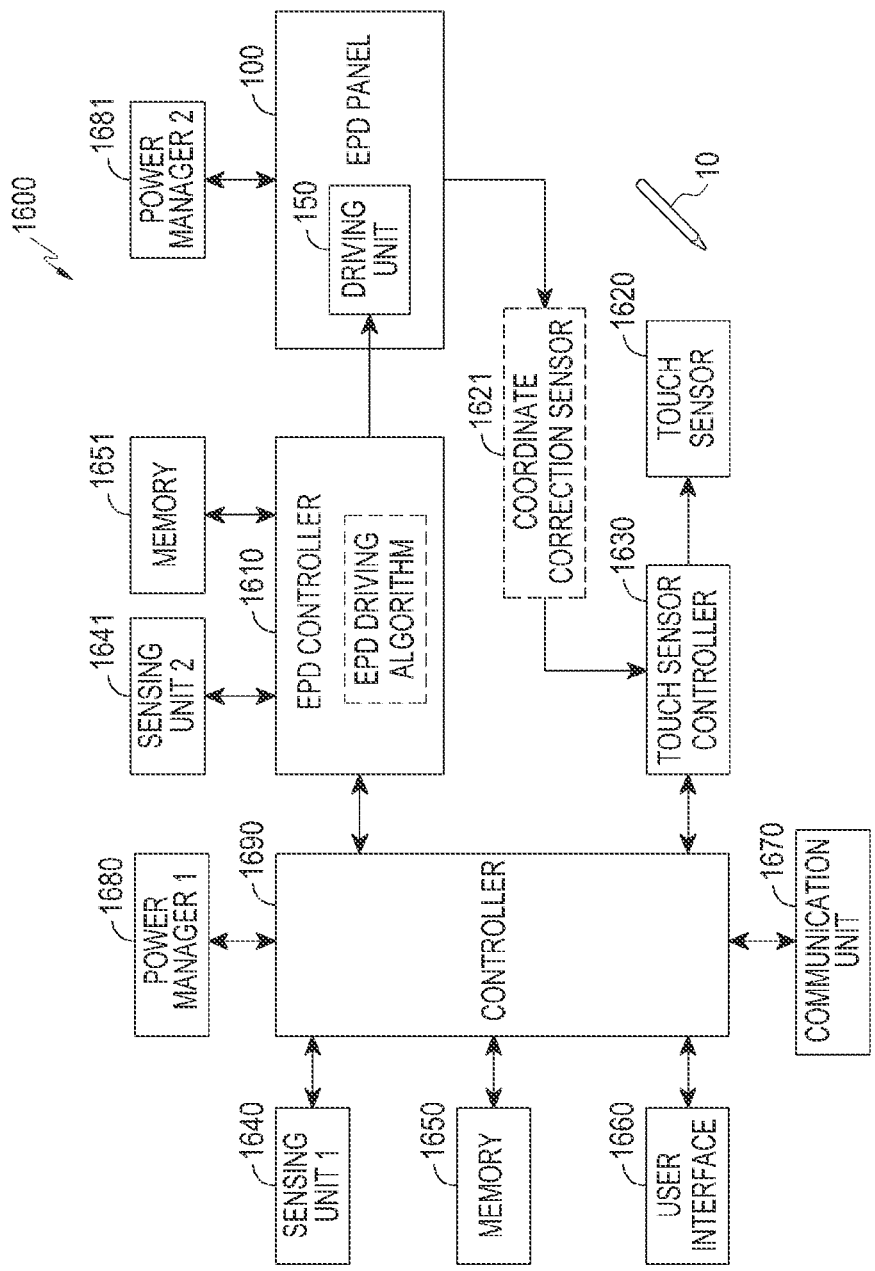
FIG. 16 is a block diagram illustrating a printing device according to an embodiment of the present invention.

FIG. 16 is block diagram illustrating a structure of the printing device 1600. In FIG. 16, a structure of the main board 1110 of the printing device 1600 is illustrated.

The printing device 1600 includes first and second sensing units 1640 and 1641, first and second memories 1650 and 1651, a user interface 1660, a communication unit 1670, first and second power managers 1680, the EPD controller 1610, the touch sensor 1620, controller 1690, and the touch sensor controller 1630, and may further selectively include the coordinate correction sensor 1621.

The printing device 1600 performs an image transferring operation by interworking with an external device, and the printing device 1600 receives user-desired content over a communication network such as the Internet, and transfers an image representing the content to the EPD panel 100. For example, the printing device 1600 may operate under control of an external device, and control by the external device may be implemented in various ways.

The printing device 1600 may be implemented with a portable communication terminal such as a cellular phone, a smart phone, or a tablet Personal Computer (PC) which has an image transfer function.

The communication unit 1670 may be a wired or wireless communication unit, and may transmit data from the controller 1690 in a wired or wireless manner or receive data from an external communication line or over the air and deliver the data to the controller 1690 in a wired or wireless manner.

The communication unit 1670 may include at least one of a mobile communication module, a wireless Local Area Network (LAN) module, and a short-range Near Field Communication (NFC) module, depending on its performance.

The mobile communication module enables the printing device 1600 to be connected with an external device through mobile communication by using at least one antenna or plural antennas (not shown) under control of the controller 1690. The mobile communication module transmits/receives a radio signal for voice communication, video communication, or a Short Messaging Service (SMS) or Multimedia Messaging Service (MMS) service with a cellular phone (not shown), a smart phone (not shown), a tablet PC (not shown), or another device (not shown), which has a phone number input to the printing device 1600.

The WLAN module may be connected to the Internet under control of the controller 1690 in a place where a wireless Access Point (AP, not shown) is installed. The WLAN module supports a WLAN standard (IEEE802.11x) of the Institute of Electrical and Electronics Engineers (IEEE). The NFC module may wirelessly perform NFC between the printing device 1600 and an image forming apparatus (not shown) under control of the controller 1690. The NFC may include Bluetooth, Infrared Data Association (IrDA), and so forth.

The user interface 1660 enables reception of a user input or providing information to a user, and may include a plurality of buttons, a microphone, a speaker, a vibration motor, a connector, a keypad, a touch screen, and so forth.

Buttons may be formed on a front surface, a side surface, or a rear surface of the main board 1110, and may include a power/lock button (not shown), a volume button (not shown), a menu button, a home button, a back button, and a search button.

A microphone receives input of voice or sound and generates an electric signal under control of the controller 1690.

A speaker may output sound corresponding to various signals (e.g., a wireless signal, a broadcast signal, a digital audio file, a digital moving image file, a captured picture, or the like) to outside the printing device 1600 under control of the controller 1690. The speaker may output sound corresponding to a function executed by the printing device 1600. A single or multiple speakers may be formed in a proper position or proper positions of the main board 1110.

A vibration motor may convert an electric signal into mechanical vibration under control of the controller 1690. For example, when the printing device 1600 is in a vibration mode and receives a voice call from another device (not shown), the vibration motor operates. A single vibration motor or multiple vibration motors may be formed in the main board 1110. The vibration motor may operate in response to a user's touch on the touch screen and continuous movement of the touch on the touch screen.

A connector may be used as an interface for connecting the printing device 1600 with the external device or a power source (not shown). Under control of the controller 1690, through a wired cable connected to the connector, data stored in the first memory 1650 of the printing device 1600 may be transmitted to the external device or data may be received from the external device. Through the wired cable connected to the connector, power may be input from a power source or a battery may be charged.

A keypad may receive a key input from the user under control of the printing device 1600. The keypad may include a physical keypad formed in the main board 1110 or a virtual keypad displayed on a touch screen.

The touch screen provides a user interface corresponding to various services (e.g., call, data transmission, broadcasting, picture/moving image capturing) to the user. The touch screen transmits user input information corresponding to at least one touch input to the user interface to the controller 1690. The touch screen receives at least one touch through a user's body (e.g., a finger including a thumb) or a touch input means (e.g., a stylus pen 10). The touch screen receives continuous movement of one of the at least one touch. The touch screen transmits an analog signal corresponding to the received continuous movement of the touch to the controller 1690.

In the present invention, the touch may include a contactless touch (e.g., a detectable distance of 1 mm or less between the touch screen and the user's body or the touch input means) as well as a contact between the touch screen and the user's body or the touch input means. The touch screen may be of, for example, a resistive type, a capacitive type, an infrared type, or an acoustic wave type.

The first sensing unit 1640 includes at least one sensor for detecting a state of the printing device 1600. For example, the first sensing unit 1640 may include a proximity sensor for detecting the user's proximity to the printing device 1600, a motion sensor for detecting a motion (e.g., rotation, acceleration, deceleration, vibration, etc.) of the printing device 1600, and a camera module. The motion sensor may include an acceleration sensor, a gravity sensor, a shock sensor, a Global Positioning System (GPS) module, a compass sensor, etc. The first sensing unit 1640 detects a state of the printing device 1600, generates a signal corresponding to the detection of the state, and transmits the generated signal to the controller 1690. For example, a GPS module receives electric waves from a plurality of GPS satellites (not shown) around the earth's orbit and calculates the position of the printing device 1600 by using a time of arrival from the GPS satellite (not shown) to the printing device 1600.

The camera module captures a still image or a moving image and delivers the captured image to the controller 1690 or stores the image in the first memory 1650, under control of the controller 1690.

The controller 1690 controls overall operations of the printing device 1600 and controls other components in the printing device 1600 to perform an image transfer operation. In the following description, the term "controller" may refer to the controller 1690, but to distinguish over other controllers, the controller 1690 may also be referred to as a main controller. The controller 1690 may include a single core, dual cores, triple cores, or quad cores. The controller 1690 may receive a broadcast signal (for example, a TV broadcast signal, a radio broadcast signal, or a data broadcast signal) and broadcast additional information (for example, an Electric Program Guide (EPG) or an Electric Service Guide (ESG)) transmitted from a broadcasting station through the communication unit 1670. The controller 1690 may reproduce a digital audio file (for example, a file having a file extension such as 'mp3', 'wma', 'ogg', or 'wav') stored in the first memory 1650 or received through the communication unit 1670. The controller 1690 may reproduce a digital video file (for example, a file having a file extension such as 'mpeg', 'mpg', 'mp4', 'avi', 'mov', or 'mkv') stored in the first memory 1650 or received through the communication unit 1670. The controller 1690 may transfer contents stored in the first memory 1650 or received through the communication unit 1670 to the EPD panel 100 in the form of an image according to a user command or menu selection input through the EPD panel 100 or the touch sensor 1620. The image may be a still or moving image.

The first memory 1650 stores a signal or data under control of the controller 1690. The first memory 1650 stores a control program or applications for control of the printing device 1600 or the controller 1690.

A term "memory" includes a Read Only Memory (ROM) or a Random Access Memory (RAM) in the controller 1690 or a memory card (not shown) (for example, a Secure Digital (SD) card or a memory stick), a non-volatile memory, a volatile memory, a Hard Disk Drive (HDD), or a Solid State Drive (SSD) mounted on the printing device 1600.

The first power manager 1680 supplies power to the printing device 1600 under control of the controller 1690. The first power manager 1680 may be connected with one battery or plural batteries (not shown). The first power manager 1680 may also supply power, which is input from an external power source (not shown) through a wired cable connected with the connector, to the printing device 1600.

The EPD controller 1610 outputs a control signal to the EPD panel 100 for driving the imaging sheet 120 and the sensing unit 130 under control of the controller 1690 and a preset EPD driving algorithm, and outputs user input information input from the EPD panel 100 to the controller 1690. The controller 1690 controls the EPD controller 1610 to adjust or update content displayed on the EPD panel 100 according to the user input information.

If the preset EPD driving algorithm is designed considering an external environment, the EPD controller 1610 receives sensing data related to the external environment measured by the second sensing unit 1641. The second sensing unit 1641 may include a temperature sensor, an illumination sensor, and a humidity sensor.

The second memory 1651 stores the sensing data and stores the preset EPD driving algorithm or data necessary for controlling the EPD panel 100. The second power manager 1681 supplies power to the EPD panel 100 under control of the controller 1690.

The touch sensor controller 1630 outputs a control signal to the touch sensor 1620 for driving the touch sensor 1620 according to control of the controller 1690 and a preset touch sensor driving algorithm and outputs user input information input to the touch sensor 1620 using a user input means such as the pen 10 to the controller 1690. The controller 1690 controls the EPD controller 1610 to adjust or update the content displayed on the EPD panel 100 according to the user input information.

The coordinate correction sensor 1621 senses the coordinate correction identification tags 141 and 142 to output alignment states of the EPD panel 100 and the printing device 1600 to the touch sensor controller 1630. In the current example, the coordinate correction sensor 1621 may be selectively included, and the touch sensor 1620 may also function as the coordinate correction sensor 1621. The coordinate correction identification tags 141 and 142 each are implemented with a resonance circuit having a coil and a condenser, a position of which may be sensed by the EMR type touch sensor 1620.

The controller 1690 provides information, which informs the user of alignment states based on alignment state information input from the touch sensor 1620 and guides the user to adjust the alignment states, through the user interface 1660 or the EPD panel 100.

Figure 17:
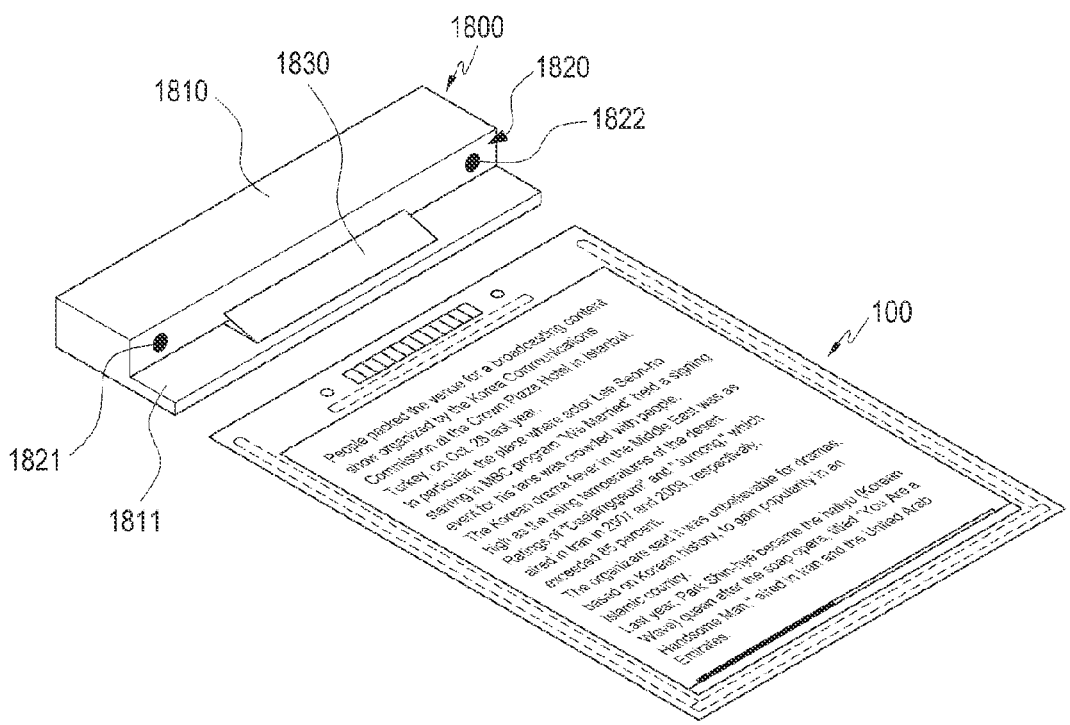
FIG. 17 is a diagram illustrating a state in which a printing device according to a second embodiment of the present invention and an EPD panel are separated.
Figure 18:
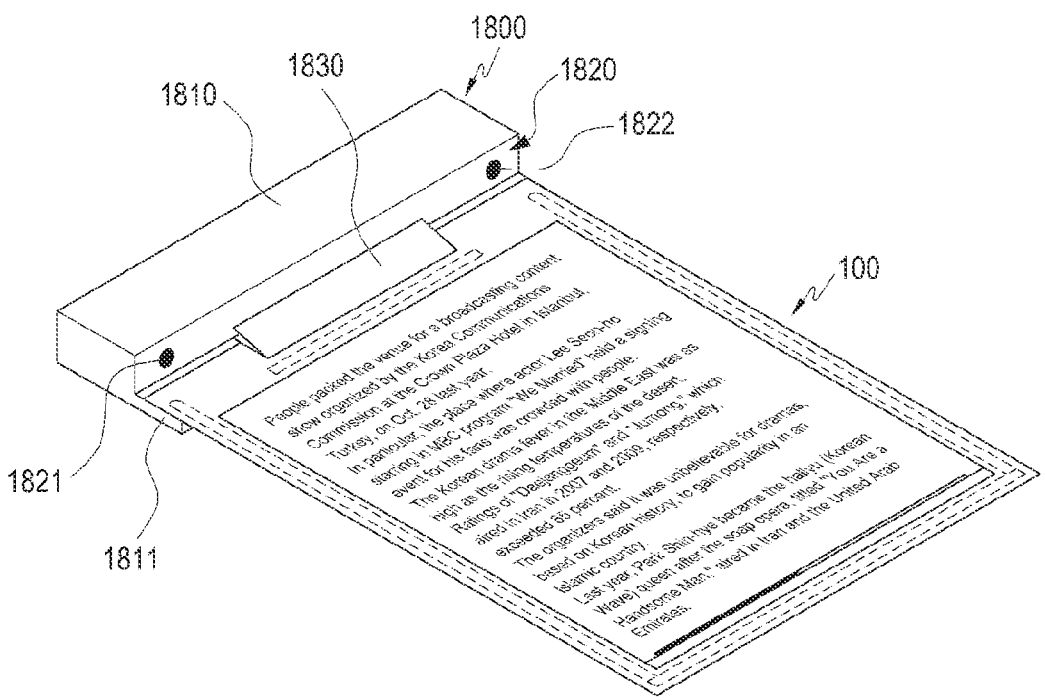
FIG. 18 is a diagram illustrating a state in which the printing device according to the second embodiment of the present invention and the EPD panel are coupled.

FIG. 17 is a diagram illustrating a state where a printing device 1800 according to a second embodiment of the present invention and the EPD panel 100 are separated, and FIG. 18 is a diagram illustrating a state where the printing device 1800 and the EPD panel 100 are coupled. The printing device 1800 a main board 1810 mounted on a substrate 1811, a clip 1830 for fixing the EPD panel 100, and a touch sensor 1820 for detecting user input.

The printing device 1800 has a structure which is similar to the printing device 1600 according to the first embodiment, except that the printing device 1800 uses an ultrasonic/infrared touch sensor as a touch sensor. Therefore, a repetitive description will be avoided.

The touch sensor 1820 includes a first sensor 1821, which includes a combination of an infrared sensor and a first ultrasonic sensor, and a second sensor 1822 including a second ultrasonic sensor. Although infrared rays are used as an example in the following description, light of another wavelength may also be used.

The first sensor 1821 and the second sensor 1822 are provided at both end portions of the main board 1810 to recognize a position of the pen which emits ultrasound and infrared rays over a wide range.

The first sensor 1821 senses ultrasound and infrared rays emitted from the pen. The second sensor 1822 senses ultrasound emitted from the pen. The first sensor 1821 and the second sensor 1822 are spaced apart from each other to measure a difference in distance to the pen by using a time difference in ultrasound sensing. The touch sensor controller calculates a distance between the pen and the first sensor 1821 based on an infrared sensing signal and a first ultrasound sensing signal from the first sensor 1821. The touch sensor controller calculates a ratio of a distance between the pen and the first sensor 1821 to a distance between the pen and the second sensor 1822 based on the first ultrasound sensing signal from the first sensor 1821 and a second ultrasound sensing signal from the second sensor 1822. Since a distance between the first sensor 1821 and the second sensor 1822 is fixed, the touch sensor controller calculates two-dimensional location information of the pen on the EPD panel 100 based on such distance information.

Figure 19:
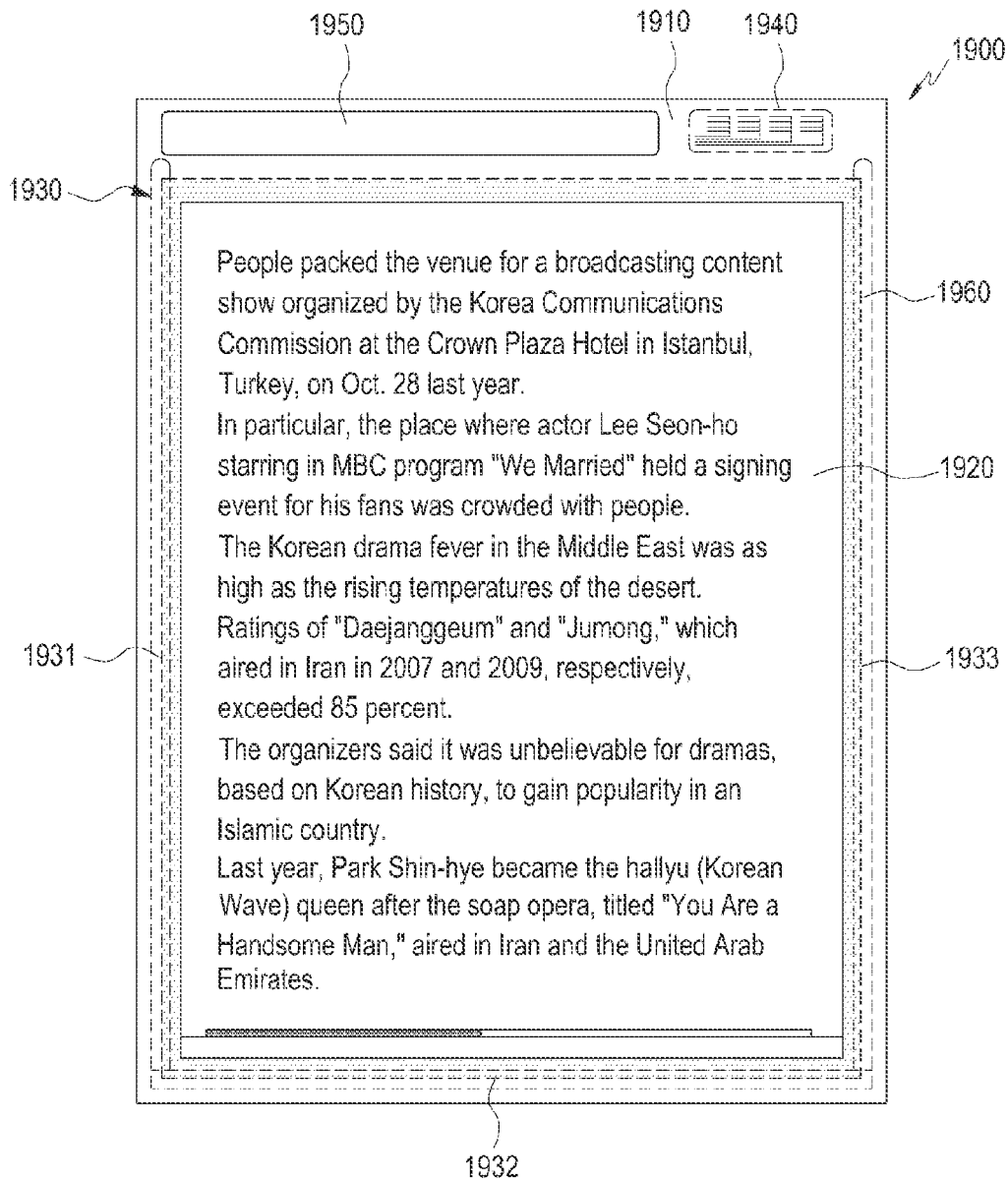
FIG. 19 is a floor plan illustrating the EPD panel according to the second embodiment of the present invention.
Figure 20:
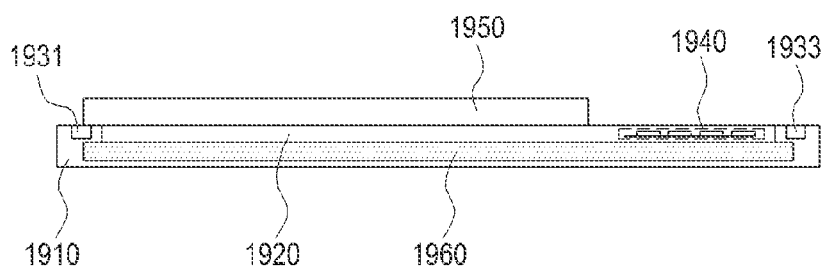
FIG. 20 is a cross-sectional view illustrating the EPD panel according to the second embodiment of the present invention.

FIG. 19 is a floor plan illustrating an EPD panel 1900 according to the second embodiment of the present invention, and FIG. 20 is a cross-sectional view illustrating the EPD panel 1900. The EPD panel 1900 has a structure which is similar to that of the EPD panel 100 according to the first embodiment of the present invention, except that the structure of the main board 1110 illustrated in FIG. 16 is integrated into the EPD panel 1900. Since the main board 1110 is integrated into the EPD panel 1900, the interface 160 for communication with the printing device 1600 illustrated in FIG. 1 and the coordinate correction identification tags 141 and 142 are not provided in the EPD panel 1900. In the following description, a repetitive description will be avoided.

The EPD panel 1900 includes a cover sheet 1910 for protecting other components in the EPD panel 1900, an imaging sheet 1920 for displaying contents, a sensing unit 1930 and a touch sensor 1960 for sensing a user input, and a main board 1950 for driving the imaging sheet 1920 and the sensing unit 1930 having first through third strips 1931 through 1933 and transferring content stored inside or received from outside to the imaging sheet 1920 in the form of an image according to a user command or user selection input through the sensing unit 1930 or the touch sensor 1960. The driving unit 150 illustrated in FIG. 1 is integrated into the main board 1950. Selectively, the EPD panel 1900 may further include a mode setting switch circuit 1940. The mode setting switch circuit 1940 may be used to set a usage or a security mode of the EPD panel 1900.

Like in FIG. 16, the main board 1950 includes first and second sensing units, first and second memories, a user interface, a communication unit, first and second power managers, an EPD controller, and a touch sensor controller.

The touch sensor 1960 may be an EMR type touch sensor like the touch sensor 1620 illustrated in FIG. 15 or a resistive or pressure type touch sensor like the sensing unit 130 illustrated in FIG. 9.

Figure 21:
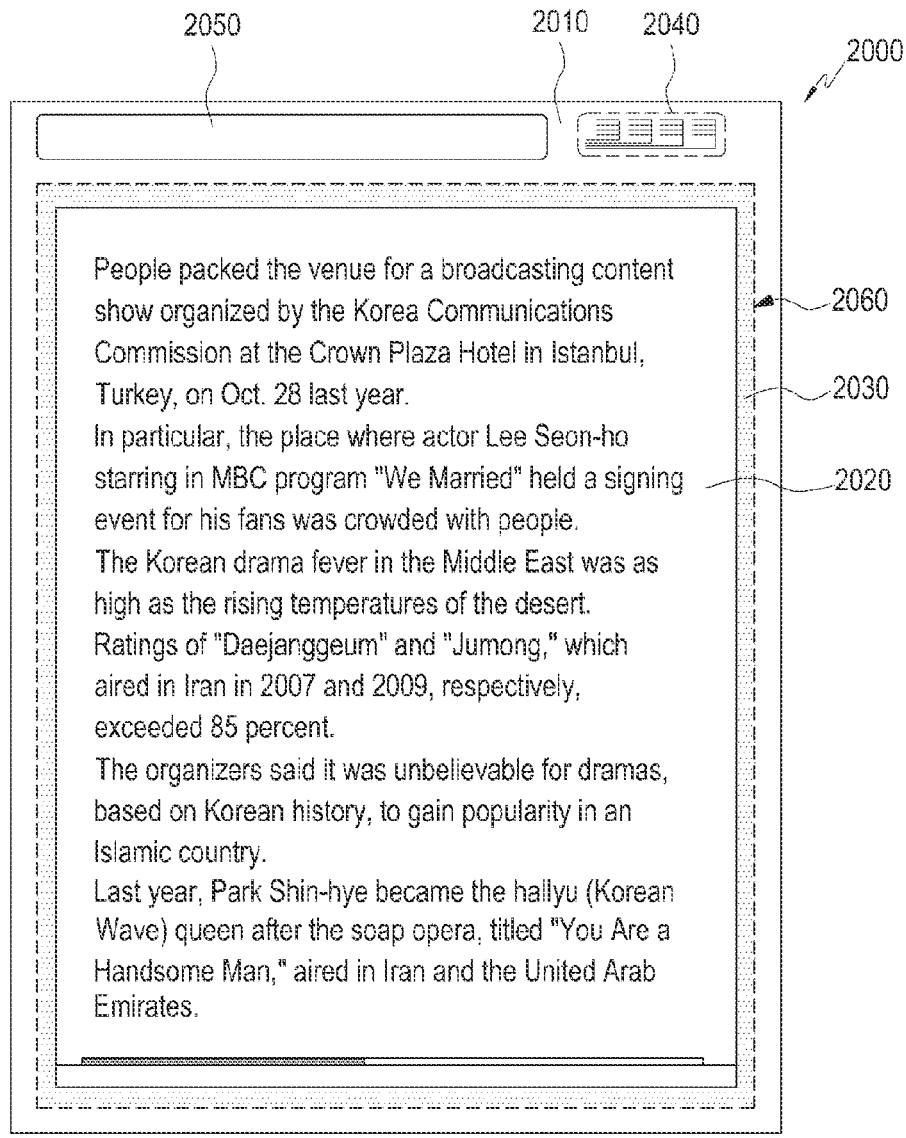
FIG. 21 is a floor plan illustrating an EPD panel according to a third embodiment of the present invention.
Figure 22:
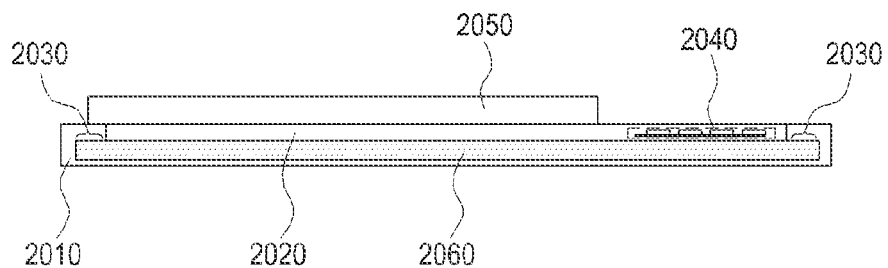
FIG. 22 is a cross-sectional view illustrating the EPD panel according to the third embodiment of the present invention.

FIG. 21 is a floor plan illustrating an EPD panel 2000 according to a third embodiment of the present invention, and FIG. 22 is a cross-sectional view illustrating the EPD panel 2000. The EPD panel 2000 has a structure which is similar to that of the EPD panel 1900 according to the second embodiment of the present invention, except that the EPD panel 2000 does not include the separate sensing unit 1930 and uses an edge portion 2030 of the touch sensor 1960 of the resistive type as a sensing unit. In the following description, a repetitive description will be avoided.

The EPD panel 2000 includes a cover sheet 2010 for protecting other components in the EPD panel 2000, an imaging sheet 2020 for displaying content, a touch sensor 2060 for sensing a user input, and a main board 2050 for driving the imaging sheet 2020 and transferring content stored inside or received from outside to the imaging sheet 2020 in the form of an image according to a user command or menu selection input through the touch sensor 2060. Selectively, the EPD panel 2000 may further include a mode setting switch circuit 2040. The mode setting switch circuit 2040 may be used to set a usage or a security mode of the EPD panel 2000.

The edge portion 2030 of the touch sensor 2060 is used as the sensing unit.

Figure 23:
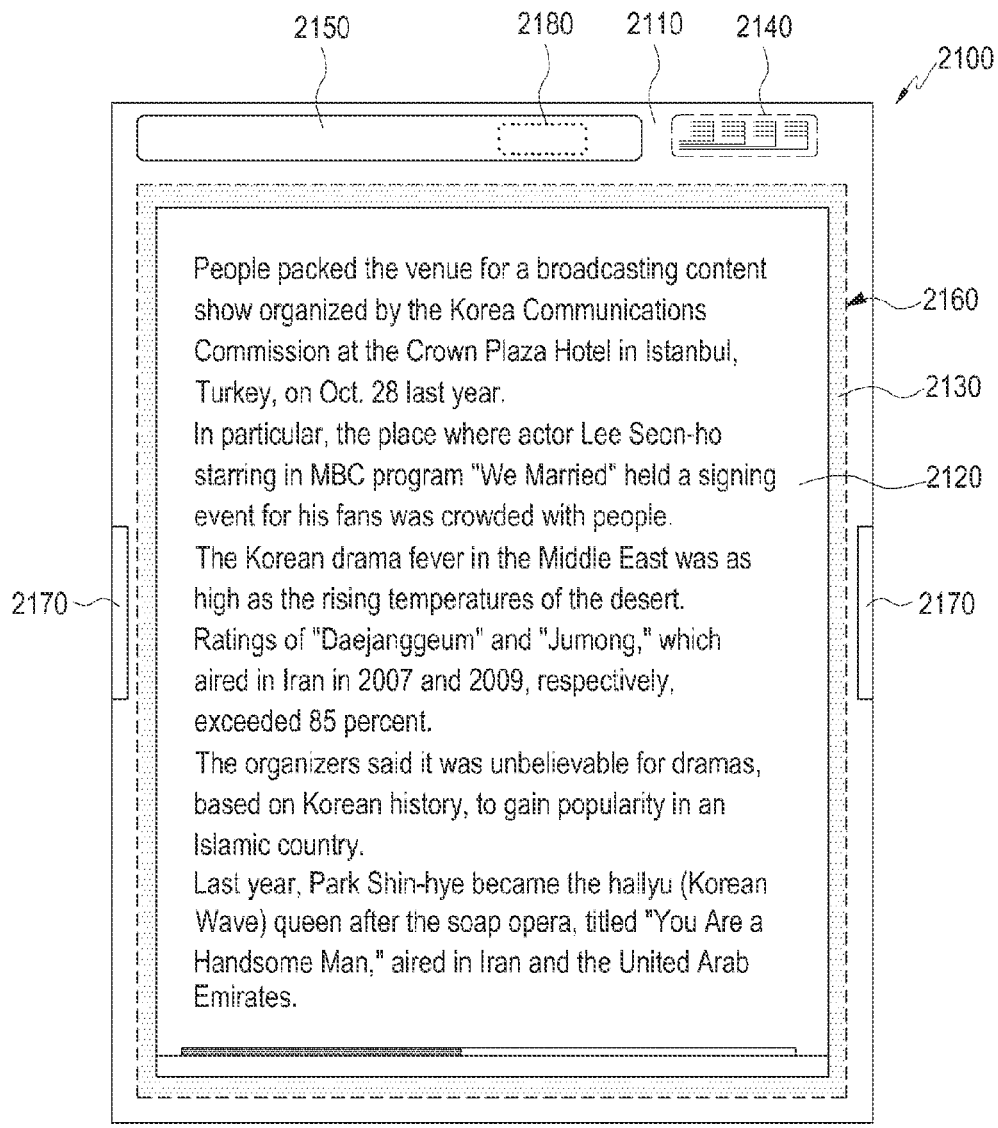
FIG. 23 is a floor plan illustrating an EPD panel according to a fourth embodiment of the present invention.
Figure 24:
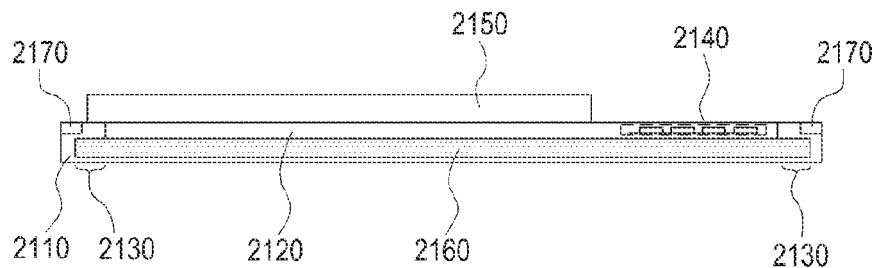
FIG. 24 is a cross-sectional view illustrating the EPD panel according to the fourth embodiment of the present invention.

FIG. 23 is a floor plan illustrating an EPD panel 2100 according to a fourth embodiment of the present invention, and FIG. 24 is a cross-sectional view illustrating the EPD panel 2100. The EPD panel 2100 has a structure which is similar to that of the EPD panel 2000 according to the third embodiment of the present invention, except that the EPD panel 2100 further includes an Electric Field Communication (EFC) function. In the following description, a repetitive description will be avoided.

The EPD panel 2100 includes a cover sheet 2110 for protecting other components in the EPD panel 2100, an imaging sheet 2120 for displaying content, a touch sensor 2160 for sensing a user input, and a main board 2150 for driving the imaging sheet 2120 and transferring content stored inside or received from outside to the imaging sheet 2120 in the form of an image according to a user command or menu selection input through the touch sensor 2160. Selectively, the EPD panel 2100 may further include a mode setting switch circuit 2140. The mode setting switch circuit 2140 may be used to set a usage or a security mode of the EPD panel 2100. The edge portion 2030 of the touch sensor 2160 is used as the sensing unit.

EFC according to the present invention may be short-range contactless communication within 10 cm or contact communication through an exposed electrode on the surface of the EPD panel 2100. The EFC transmits digital data without performing analog conversion or frequency modulation.

The EFC of the short-range contactless communication type is achieved by outputting an electric field over the air through an electrode which functions as an antenna, and as the electrode for the EFC, a common electrode of the imaging sheet 2120 (for example, the common electrode 370 illustrated in FIG. 3), a pixel electrode of the imaging sheet 2120 (for example, the pixel electrode 320 illustrated in FIG. 5), or an electrode of the touch sensor 2160 (for example, the first sub loop unit 1510 or the second sub loop unit 1520 illustrated in FIG. 15) may be used. Alternatively, an electrode of the sensing unit 1930 in the structures illustrated in FIGS. 19 and 20 (for example, the first electrode line 813 or the second electrode line 822 illustrated in FIG. 9) may be used as the electrode of the EFC.

In the current example, a contact communication type EFC using the exposed electrode on the surface of the EPD panel 2100 is used.

For the EFC, the EPD panel 2100 may further include an electrode 2170 exposed on its surface. The electrode 2170 may be connected to a common electrode layer of the imaging sheet 2120 or to another electrode in the EPD panel 2100.

Alternatively, the main board 2150 of the EPD panel 2100 may include an electrode 2180 for the EFC which is exposed on its surface.

The controller transmits data currently displayed on the imaging sheet 2120 or data stored in the memory to another EPD panel through the EFC.

Figure 25:
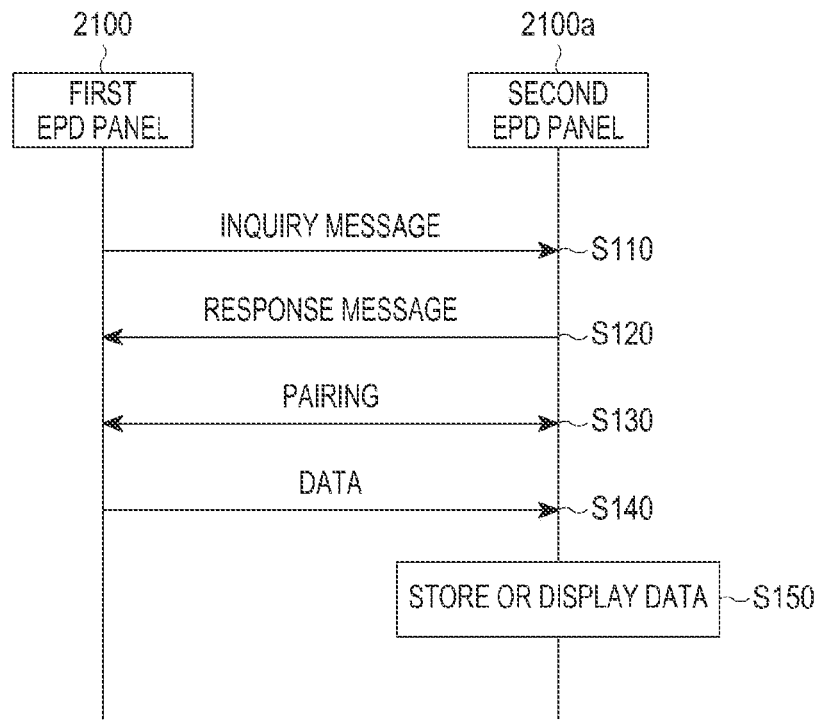
FIG. 25 is a flow diagram illustrating electric-field communication between EPD panels according to the present invention.
Figure 26:
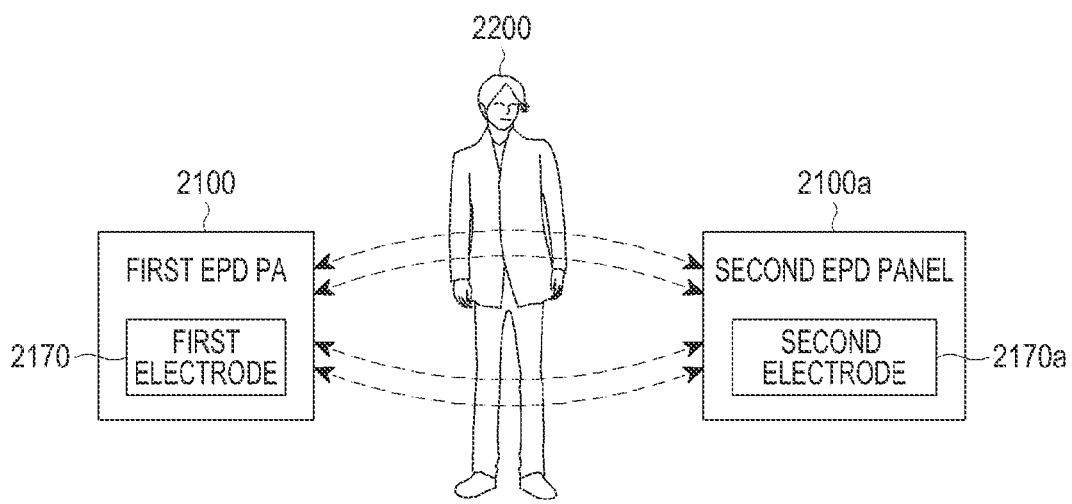
FIG. 26 is a diagram describing electric-field communication of a contact type.

FIG. 25 is a flow diagram illustrating EFC between EPD panels according to the present invention, and FIG. 26 is a diagram describing contact-type EFC.

In the following description, functions performed by respective EPD panels 2100 and 2100*a* are performed by controllers of the EPD panels 2100 and 2100*a* using other components, with reference to FIGS. 23 and 24.

In step S110, the first EPD panel 2100 sends an inquiry message through the first electrode 2170 to determine whether another EPD panel exists around the first EPD panel 2100. That is, the first EPD panel 2100 starts searching for a peripheral terminal while performing the inquiry. With a contact-type EFC, the first EPD panel 2100 may sense a resistance change of the first electrode 2170 indicating that the first EPD panel 2100 is human-body-connected with the second EPD panel 2100*a*, and after sensing so, performs step S110.

Referring to FIG. 26, if a user simultaneously contacts the first electrode 2170 of the first EPD panel 2100 and a second electrode 2170*a* of the second EPD panel 2100*a*, the first EPD panel 2100 and the second EPD panel 2100*a* are connected to each other through the user's body. In such a human-body-connection state, non-modulated (that is, non-analog-converted or non-frequency-modulated) digital data output from the first electrode 2170 may be delivered to the second electrode 2170*a* through the human body.

In step S120, the second EPD panel 2100*a* in a discoverable mode sends an inquiry response message with respect to the inquiry through the second electrode 2170*a*. The found second EPD panel 2100*a* transmits information for pairing with the first EPD panel 2100 through the inquiry response message. For example, the inquiry response message may include a device identifier and various communication setting information such as synchronization information.

In step S130, the first EPD panel 2100 and the second EPD panel 2100*a* are paired with each other, and in this paired state, they transmit and receive data with each other.

In step S140, the first EPD panel 2100 transmits data currently displayed or stored in the memory to the second EPD panel 2100*a* through the first electrode 2170. The data transmission may be performed automatically or by a user selection. For example, the first EPD panel 2100 inquires of the user whether to transmit data (for example, through display on a message window) and then the user may select whether to transmit data (for example, by selecting a send button on the message window). As another example, the first EPD panel 2100 may display a list of data which may be transmitted to the user, and the user may select data from the data list. Likewise, transmission of the inquiry message, transmission of the response message, or pairing may also be performed according to user's selection.

In step S150, the second EPD panel 2100 displays data received through the second electrode 2170*a* to the user or stores the data in memory.

Figure 27:
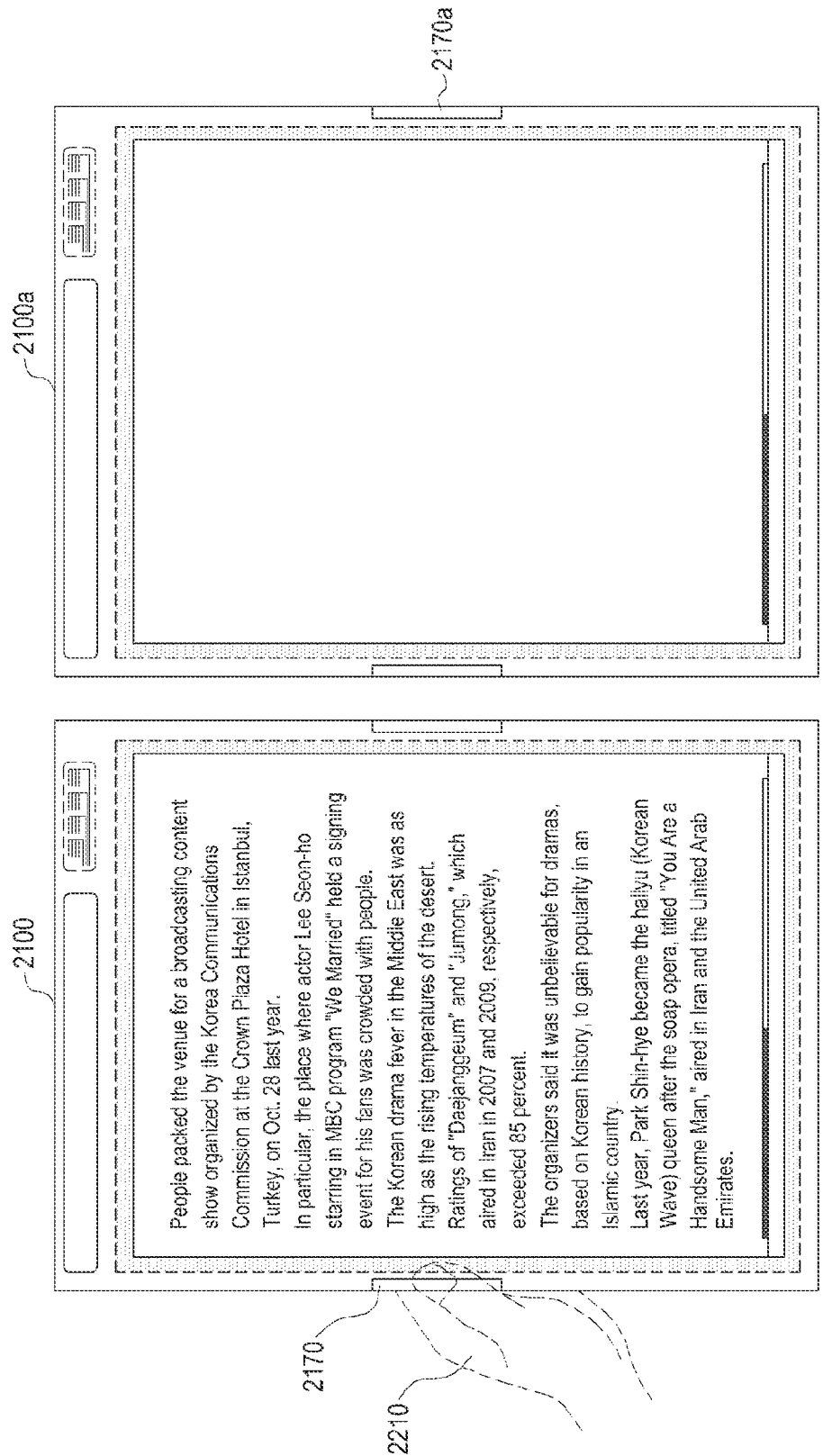
FIGS. 27 and 28 are diagrams describing an example of electric-field communication.
Figure 28:
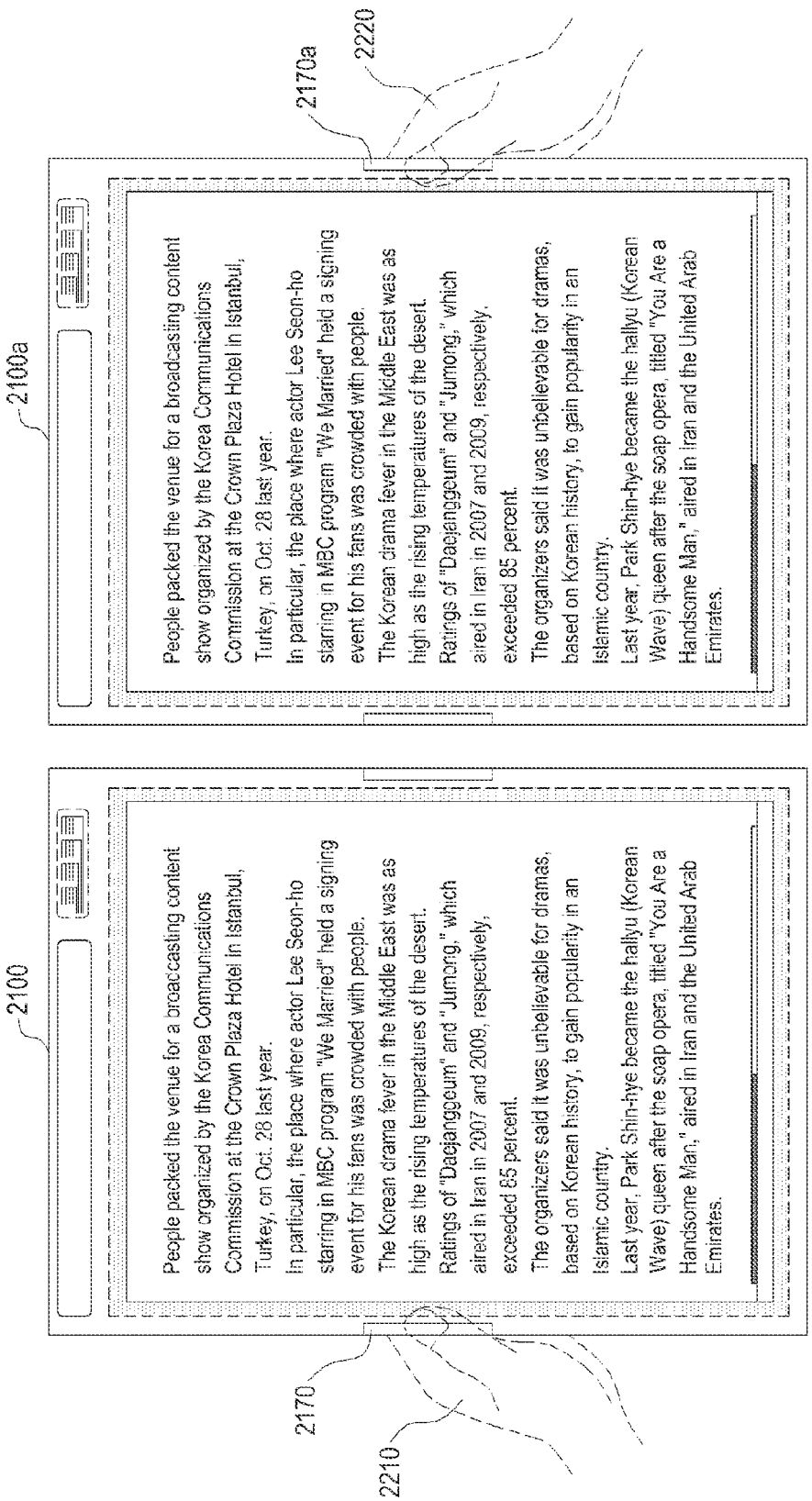

FIGS. 27 and 28 are diagrams for describing an example of EFC.

Referring to FIG. 27, content is displayed on the first EPD panel 2100, while there is no content displayed on the second EPD panel 2100*a*. If contact-type EFC is set, a user's left hand 2210 contacts the first electrode 2170 of the first EPD panel 2100, but the user does not contact the second electrode 2170*a* of the second EPD panel 2100*a*, such that data communication between the first EPD panel 2100 and the second EPD panel 2100*a* is not performed.

Referring to FIG. 28, if the user's left hand 2100 contacts the first electrode 2170 of the first EPD panel 2100 and a user's right hand 2220 contacts the second electrode 2170*a* of the second EPD panel 2100*a*, data communication between the first EPD panel 2100 and the second EPD panel 2100*a* is performed. In the current example, content of the first EPD panel 2100 are transmitted to the second EPD panel 2100*a* and the second EPD panel 2100*a* displays the received content to the user.

Figure 29:
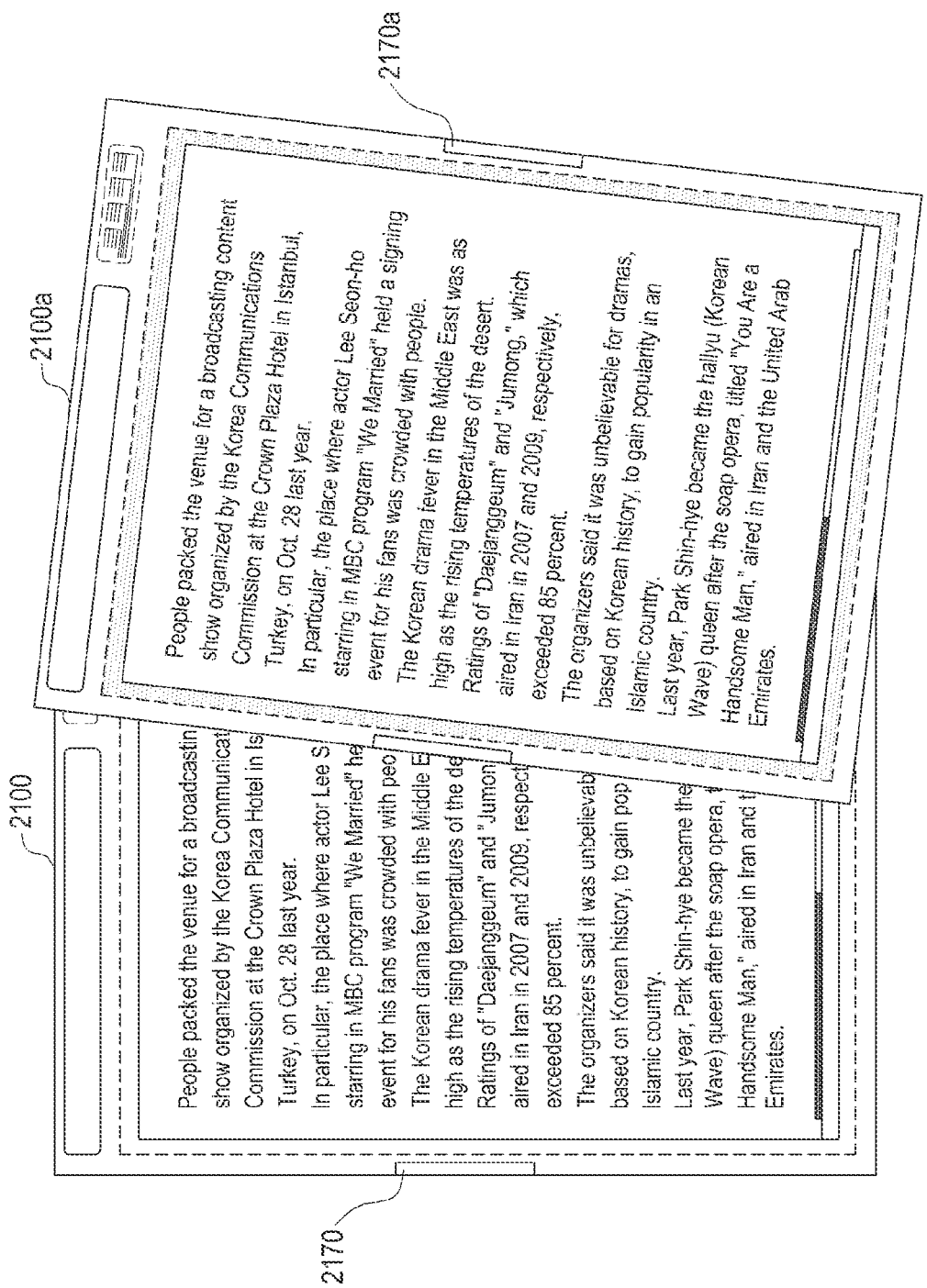
FIG. 29 is a diagram describing another example of electric-field communication.

FIG. 29 is a diagram describing another example of EFC.

As in FIG. 27, when content is displayed on the first EPD panel 2100, while there is no content displayed on the second EPD panel 2100*a*, if the first EPD panel 2100 and the second EPD panel 2100*a* are positioned close to each other by overlapping each other or passing next to or over each other, then the content of the first EPD panel 2100 is transmitted to the second EPD panel 2100*a*.

As is apparent from the foregoing description, electronic paper may be used as if it is general flexible and cheap paper.

It can be seen that the embodiments of the present invention can be implemented with hardware, software, or a combination of hardware and software. Such arbitrary software may be stored, whether or not erasable or re-recordable, in a volatile or non-volatile storage such as a Read-Only Memory (ROM); a memory such as a Random Access Memory (RAM), a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape.

It can be seen that the memory which may be included in the printing device is an example of a machine-readable storage medium which is suitable for storing a program or programs including instructions for implementing the embodiments of the present invention. Therefore, the present invention includes a program including codes for implementing an apparatus or method claimed in an arbitrary claim and a machine-readable storage medium for storing such a program. The program may be electronically transferred through an arbitrary medium such as a communication signal delivered through wired or wireless connection, and the present invention properly includes equivalents thereof. The printing device may receive and store the program from a program providing device connected in a wired or wireless manner. The program providing device may include a memory for storing a program including instructions for instructing the printing device to execute a preset image transferring method, information necessary for the image transferring method, a communication unit for performing wired or wireless communication with the printing device, and a controller for transmitting a corresponding program to the printing device at the request of the printing device or automatically.

While the present invention has been particularly illustrated and described with reference to certain embodiments thereof, various modifications or changes can be made without departing from the scope of the present invention. Therefore, the scope of the present invention is not limited to the disclosed embodiments, and it should be defined by the scope of the following claims and equivalents thereof.

What is claimed is:

1. A printing device for transferring an image representing content on electronic paper, the printing device comprising:
   an electronic paper controller which generates a control signal for transferring the image and outputs the generated control signal to the electronic paper;
   a touch sensor on a top surface of which the electronic paper is disposed to detect a user input;
   a touch sensor controller which outputs a control signal to the touch sensor for driving the touch sensor and receives the user input detected by the touch sensor; and
   a main controller which controls the electronic paper controller to change an image displayed on the electronic paper according to a command corresponding to the user input from the touch sensor controller,
   wherein the electronic paper displays selectable menus, and the electronic paper includes a sensor having first, second and third strips, and
   wherein, when the main controller detects bending along a virtual index line which crosses both the second strip and one of the first and third strips, the main controller determines that one of the selectable menus crossed by the virtual index line is selected.

2. The printing device of claim 1, further including a user interface for receiving a user input or informing a user of information.

3. The printing device of claim 2, wherein the main controller provides alignment state or alignment guide information through the user interface or the electronic paper.

4. The printing device of claim 1, wherein the touch sensor is an electromagnetic wave type touch sensor.

5. The printing device of claim 1, wherein the electronic paper controller, the touch sensor controller, and the main controller are mounted on a single substrate, and the printing device further comprises a clip for fixing the electronic paper to the single substrate.

6. The printing device of claim 5, wherein the single substrate comprises a protrusion which passes through a hole formed in the electronic paper.

7. The printing device of claim 1, wherein the first, second and third strips are U-shaped.

8. Electronic paper comprising:
   an imaging sheet which displays selectable menus;
   a sensor which detects a bent portion of the electronic paper, the sensor having first, second and third strips; and
   a driving unit which drives the imaging sheet and the sensor,
   wherein, when the electronic paper detects bending along a virtual index line which crosses both the second strip and one of the first and third strips, the electronic paper transmits information on the bent portion of the sensor to an external device which determines that one of the selectable menus crossed by the virtual index line is selected.

9. The electronic paper of claim 8, further comprising a coordinate correction identification tag which is identified by the external device in communication with the electronic paper through an interface of the electronic paper.

10. The electronic paper of claim 9, wherein the coordinate correction identification tag emits an electromagnetic field induced from outside.

11. The electronic paper of claim 8, further comprising a groove inserted into a protrusion formed on the external device.

12. The electronic paper of claim 8, further comprising a controller for communicating with the external device by using an electrode of the electronic paper.

13. The electronic paper of claim 12, wherein the electrode is exposed to outside.

14. The electronic paper of claim 8, wherein the sensor is disposed in an edge portion of the imaging sheet or in a circumferential portion of the imaging sheet.

15. The electronic paper of claim 8, wherein the sensor is a resistive type touch sensor.

16. The electronic paper in claim 8, further comprising a coordinate correction identification tag which can be identified by the external device.

17. The electronic paper of claim 8, wherein the first, second and third strips are U-shaped.

18. Electronic paper having four sides, comprising:
   an imaging sheet capable of displaying one or more pages; and
   a sensor capable of detecting user input, comprising:
      a first strip on a first side of the electronic paper;
      a second strip on a second side of the electronic paper; and
      a third strip on a third side of the electronic paper,
   wherein, when a page is displayed on the imaging sheet, the electronic paper detects selection by a user of one of a plurality of possible functions regarding the displayed page by input received through one of the strips comprising the sensor, and
   wherein the received input comprises a direction indicated by the user.

19. The electronic paper of claim 18, wherein the user indicates the direction of the input by pressing the sensor strip in one of a rightward, leftward, upward, or downward direction with respect to the displayed page.

* * * * *